(12) United States Patent
Anteau

(10) Patent No.: US 11,073,139 B2
(45) Date of Patent: Jul. 27, 2021

(54) POWER GENERATION SYSTEM

(71) Applicant: Mark R Anteau, Toledo, OH (US)

(72) Inventor: Mark R Anteau, Toledo, OH (US)

( * ) Notice: Subject to any disclaimer, the term of this patent is extended or adjusted under 35 U.S.C. 154(b) by 0 days.

(21) Appl. No.: 16/116,903

(22) Filed: Aug. 29, 2018

(65) Prior Publication Data

US 2020/0095985 A1 Mar. 26, 2020

Related U.S. Application Data

(60) Provisional application No. 62/551,781, filed on Aug. 29, 2017, provisional application No. 62/622,048, filed on Jan. 25, 2018.

(51) Int. Cl.
*F03G 7/04* (2006.01)
*F04F 5/02* (2006.01)

(52) U.S. Cl.
CPC . *F03G 7/04* (2013.01); *F04F 5/02* (2013.01)

(58) Field of Classification Search
CPC .................................... F03G 7/04; F04F 5/02
USPC ................................ 290/54; 405/78; 60/398
See application file for complete search history.

(56) References Cited

U.S. PATENT DOCUMENTS

| | | | | |
|---|---|---|---|---|
| 2,072,930 A | * | 3/1937 | Voorduin | E02B 9/00 405/78 |
| 3,648,458 A | | 3/1972 | McAlister | |
| 4,083,186 A | | 4/1978 | Jackson, Sr. | |
| 4,307,299 A | * | 12/1981 | Norton | F02C 6/16 290/52 |
| 4,391,097 A | * | 7/1983 | Tsunoda | F03B 13/06 417/53 |
| 4,408,452 A | * | 10/1983 | Tsunoda | F03B 3/10 415/910 |
| 4,450,690 A | | 5/1984 | Clark, Jr. | |
| 4,617,801 A | | 10/1986 | Clark, Jr. | |
| 4,629,904 A | * | 12/1986 | Rojo, Jr. | F03B 13/086 290/1 R |
| 4,746,244 A | * | 5/1988 | Broome | E02B 9/00 290/52 |
| 4,797,563 A | * | 1/1989 | Richardson | F02C 3/00 290/43 |
| 4,819,697 A | | 4/1989 | Randa et al. | |
| 4,883,411 A | | 11/1989 | Windle | |
| 4,991,397 A | * | 2/1991 | Varsa | F03B 3/04 60/398 |

(Continued)

OTHER PUBLICATIONS

Robert P. Siegel, Head Augmentation in Hydraulic Turbines by Means of Draft Tube Ejectors, Virginia Polytechnic Institute, Blacksburg, Virginia, USA (May 1982).

*Primary Examiner* — Pedro J Cuevas
(74) *Attorney, Agent, or Firm* — Schonauer Law LLC

(57) ABSTRACT

The power plant disclosed is an engine that derives its usefulness in the pursuit of energy generation by utilizing hydrostatic pressure differentials found or created in various liquids, gases or solutions, such as but not limited to water and air. It is generally provided as a configuration designed to create a pressure differential, and to use the pressure differential to increase the effective head seen via a penstock and turbine system. Pump systems that are employed include venturi systems, jet pump systems and other comparable mixed-pressure vacuum pumps. Multiple power generating systems are interconnected to provide continuous and constant power generation through a penstock and turbine system.

20 Claims, 33 Drawing Sheets

(56) References Cited

U.S. PATENT DOCUMENTS

| | | | | |
|---|---|---|---|---|
| 5,099,648 | A * | 3/1992 | Angle | F02C 1/04 |
| | | | | 417/150 |
| 5,329,497 | A | 7/1994 | Previsic et al. | |
| 5,426,332 | A | 6/1995 | Ullman et al. | |
| 6,250,199 | B1 | 6/2001 | Schulte et al. | |
| 6,313,545 | B1 * | 11/2001 | Finley | F03B 13/00 |
| | | | | 290/54 |
| 6,546,723 | B1 * | 4/2003 | Watten | F03B 13/00 |
| | | | | 60/398 |
| 6,559,554 | B2 * | 5/2003 | Finley | F03B 13/00 |
| | | | | 290/54 |
| 6,800,954 | B1 | 10/2004 | Meano | |
| 6,803,670 | B2 | 10/2004 | Peloquin | |
| 7,132,759 | B2 * | 11/2006 | Alstot | F03G 7/005 |
| | | | | 290/54 |
| 7,239,037 | B2 * | 7/2007 | Alstot | F03B 13/00 |
| | | | | 290/43 |
| 7,329,962 | B2 * | 2/2008 | Alstot | F03B 13/00 |
| | | | | 290/43 |
| 7,918,087 | B1 * | 4/2011 | Brown | F03B 7/006 |
| | | | | 60/398 |
| 7,926,501 | B2 | 4/2011 | Springett et al. | |
| 8,049,351 | B2 | 11/2011 | Mahawili | |
| 8,196,396 | B1 * | 6/2012 | Tseng | F03B 13/08 |
| | | | | 290/54 |
| 8,231,327 | B2 * | 7/2012 | Davis, Sr. | F03G 7/04 |
| | | | | 415/3.1 |
| 8,234,861 | B2 * | 8/2012 | Frye | F03B 17/00 |
| | | | | 290/43 |
| 8,424,300 | B1 * | 4/2013 | Navarro | F04B 17/00 |
| | | | | 290/53 |
| 8,446,031 | B2 | 5/2013 | Roberts | |
| 8,631,638 | B2 * | 1/2014 | Carlos | F02C 6/00 |
| | | | | 405/78 |
| 8,946,922 | B1 * | 2/2015 | Johnson | F03B 17/061 |
| | | | | 290/53 |
| 9,038,377 | B2 * | 5/2015 | Anteau | F03B 17/005 |
| | | | | 290/53 |
| 9,127,639 | B2 * | 9/2015 | Cho | F03B 13/10 |
| 9,234,494 | B2 * | 1/2016 | Anteau | F03B 17/005 |
| 9,234,495 | B2 * | 1/2016 | Anteau | F03B 17/025 |
| 9,752,549 | B2 | 9/2017 | Roberts | |
| 10,221,830 | B2 | 3/2019 | Schneider | |
| 10,428,786 | B2 * | 10/2019 | Navarro | F04B 17/00 |
| 10,527,021 | B2 | 1/2020 | Schneider | |
| 10,781,787 | B2 * | 9/2020 | Hector, Jr. | H02K 7/1823 |
| 10,801,476 | B2 * | 10/2020 | Ekanem | F03G 3/00 |
| 2002/0130520 | A1 | 9/2002 | Finley | F03G 7/04 |
| | | | | 290/54 |
| 2003/0066289 | A1 * | 4/2003 | Watten | F03B 13/00 |
| | | | | 60/398 |
| 2003/0164613 | A1 * | 9/2003 | Finley | F03G 7/04 |
| | | | | 290/54 |
| 2005/0082837 | A1 * | 4/2005 | Alstot | F03G 7/005 |
| | | | | 290/54 |
| 2005/0236842 | A1 * | 10/2005 | Alstot | F03B 13/00 |
| | | | | 290/54 |
| 2006/0006657 | A1 * | 1/2006 | Alstot | F03B 13/00 |
| | | | | 290/54 |
| 2007/0152452 | A1 * | 7/2007 | Finley | F03G 7/04 |
| | | | | 290/54 |
| 2009/0152871 | A1 * | 6/2009 | Ching | F03B 17/005 |
| | | | | 290/54 |
| 2010/0170236 | A1 * | 7/2010 | Lezi | E02B 8/00 |
| | | | | 60/398 |
| 2010/0194116 | A1 | 8/2010 | Mahawili | |
| 2010/0209192 | A1 * | 8/2010 | Behm | F03B 13/086 |
| | | | | 405/87 |
| 2011/0042956 | A1 * | 2/2011 | Frye | F03B 17/00 |
| | | | | 290/54 |
| 2011/0109089 | A1 * | 5/2011 | Frye | F03B 13/08 |
| | | | | 290/54 |
| 2011/0110797 | A1 * | 5/2011 | Cho | F03B 17/06 |
| | | | | 417/65 |
| 2011/0204642 | A1 * | 8/2011 | Davis, Sr. | F03G 7/04 |
| | | | | 290/52 |
| 2011/0258996 | A1 | 10/2011 | Ingersoll et al. | |
| 2011/0278844 | A1 * | 11/2011 | Davis, Sr. | F03G 7/04 |
| | | | | 290/52 |
| 2011/0278845 | A1 * | 11/2011 | Davis, Sr. | F03G 7/04 |
| | | | | 290/52 |
| 2012/0038165 | A1 * | 2/2012 | Carlos | F03B 13/08 |
| | | | | 290/54 |
| 2012/0167563 | A1 | 7/2012 | Cherepashenets et al. | |
| 2013/0019971 | A1 * | 1/2013 | Anteau | F03B 17/025 |
| | | | | 137/571 |
| 2014/0028028 | A1 * | 1/2014 | Frye | F03B 17/06 |
| | | | | 290/54 |
| 2014/0130497 | A1 * | 5/2014 | Anteau | F03B 17/025 |
| | | | | 60/639 |
| 2014/0216022 | A1 * | 8/2014 | Jiang | F02C 6/16 |
| | | | | 60/327 |
| 2014/0246860 | A1 * | 9/2014 | Payre | F03D 9/255 |
| | | | | 290/54 |
| 2014/0312623 | A1 * | 10/2014 | Anteau | F03G 7/04 |
| | | | | 290/52 |
| 2017/0184069 | A1 | 6/2017 | Roberts | |
| 2017/0204830 | A1 | 7/2017 | Schneider | |
| 2019/0383260 | A1 * | 12/2019 | Frye | F03B 17/025 |
| 2020/0080531 | A1 * | 3/2020 | Hector, Jr. | F03B 13/266 |
| 2020/0080538 | A1 * | 3/2020 | Hector, Jr. | H02J 3/38 |
| 2020/0191109 | A1 * | 6/2020 | Hector, Jr. | F03B 13/08 |
| 2020/0208615 | A1 * | 7/2020 | Ekanem | F03G 3/00 |
| 2020/0378354 | A1 * | 12/2020 | Hector, Jr. | H02K 7/1823 |
| 2020/0400114 | A1 * | 12/2020 | Hector, Jr. | F03B 13/08 |

* cited by examiner

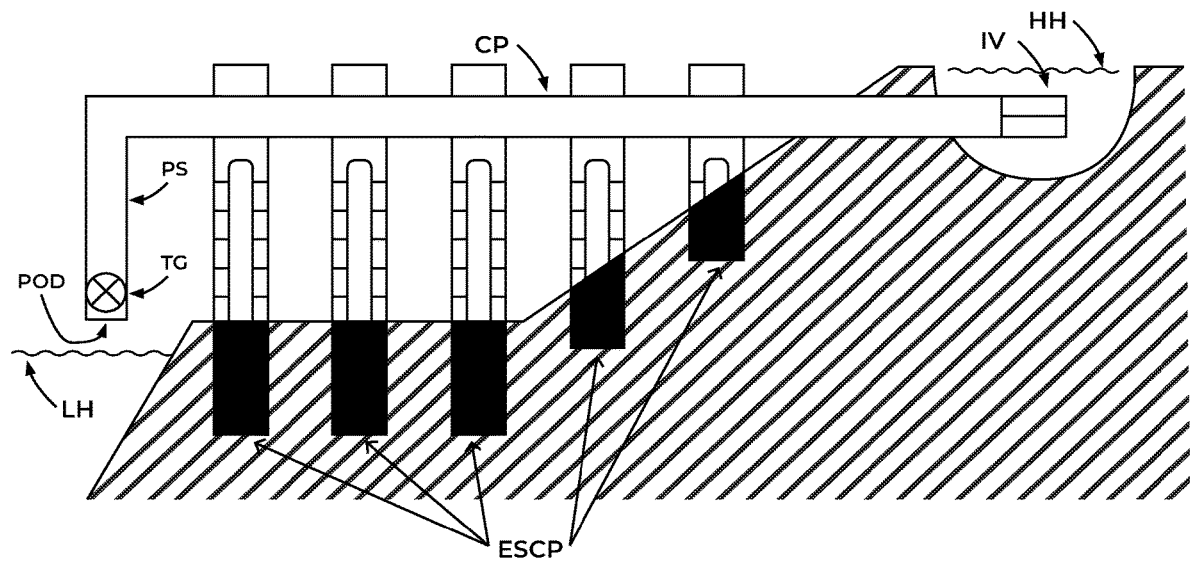
Figure 34A
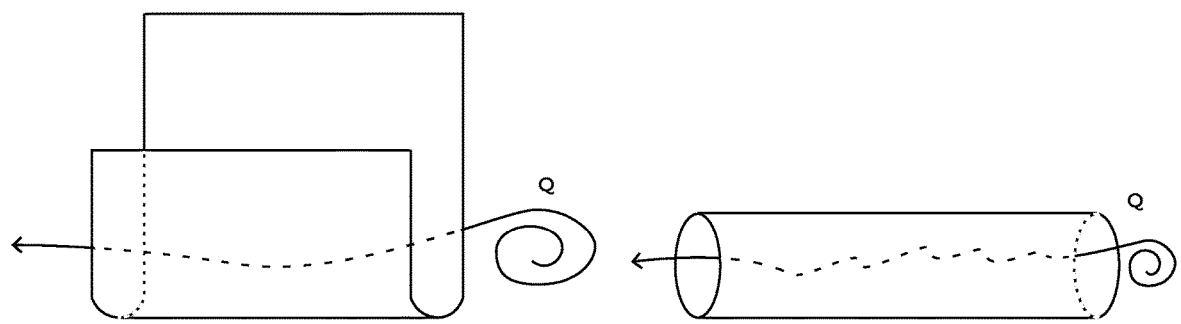
Figure 34B
Figure 34C

POWER GENERATION SYSTEM

CROSS-REFERENCE TO RELATED APPLICATIONS

This application claims the benefit of U.S. provisional patent application No. 62/551,781 filed 29 Aug. 2017, and U.S. provisional patent application No. 62/622,048 filed 25 Jan. 2018, the disclosures of each of which are both hereby incorporated by reference.

TECHNICAL FIELD

Exemplary embodiments of the present invention relate generally to the field of power generation, and more specifically to hydroelectric power generation systems and methods based on renewable energy and pressure differential principles.

BACKGROUND OF THE INVENTION

As energy sources based on fossil fuels become ever more expensive to maintain and their environmental cost is realized and quantified, the world has turned to renewable energy sources to combat these disadvantages of traditional energy generation methods. A sharply increasing demand curve continues to push the need for innovative new ways to generate power. There is thus a current need for new sources of energy that utilize renewable sources to generate that energy.

A particularly salient obstacle to power generation is the power input needed for use in the generation scheme. The input power required will inherently reduce the efficiency, and therefore the viability of, the system. Therefore, there is a need for a power generation scheme that utilizes natural phenomenon to both reduce the input power required to operate the system and to provide a usable energy source greater than the input power needed to operate the system when combined with the naturally-occurring energy inputs.

Previous work by the applicant has disclosed a power generation system based upon the use of, in combination or in part, natural pressure gradients, fluid flow and buoyant forces. These disclosures can be found, for example in U.S. Pat. No. 9,038,377 (issued 26 May 2015), U.S. Pat. No. 9,234,494 (issued 12 Jan. 2016) and U.S. Pat. No. 9,234,495 (issued 12 Jan. 2016), the contents of each of which are hereby incorporated by reference as if fully restated herein. While those disclosed systems and methods have been shown to be effective in power generation, there remains further need for efficiency gains and variations upon these systems and methods in order to meet society's ever-growing energy needs effectively and in an environmentally friendly manner.

It is therefore an unmet need in the prior art for more efficient power generation systems able to harness more renewable energy and being adaptable for increasing the efficacy of existing power generation systems. No known references, taken alone or in combination, are seen as teaching or suggesting the presently claimed power generation system.

BRIEF SUMMARY OF THE INVENTION

Exemplary embodiments of the present disclosure pertain to innovative systems and method for performing work such as but not limited to generating power (electricity), lifting items, pumping liquids/gases/solutions and operating mechanisms such as a saw, mill, or other devices generally requiring a force input. This document will disclose the manner in which the invention generates power (electricity) using a pressure differential from a natural source of water, a man-made source of water or a combination of a natural and a man-made source of water. Natural sources of water include but are not limited to an ocean, lake, river, spring, stream, wave action (surf), tides and run-off water. Man-made water supplies include but are not limited to dams/reservoirs, water towers, canals, tanks, pipes, ditches and wells. The water can, also, come from any combination of natural or man-made sources. The invention uses a pressure differential to move water through a power plant in an alternative wave action to perform work. The system is reset at the end of each stroke in the cycle to reverse the wave action allowing the flow and system to return to its beginning state.

Under the same conditions such as but not limited to: location, geography/topography, size of dam, size of reservoir and depth of reservoir the invented system can extend the length/height of its penstock further than current technology allows. Accordingly, the invented system can generate more power at comparable efficiencies to traditional hydroelectric power plants using any natural source of water, man-made source of water or any combination of a natural and man-made sources of water than any current/traditional hydroelectric power plant in operation today. Some examples include but are not limited to the following: Given a head of water that is five feet deep in theory and under the right conditions, the invented system can have a penstock length significantly longer than five feet. Theoretically, this innovation can outperform current hydroelectric power plants using the same dam reservoir system. If a dam is 50 feet tall and has a reservoir that is 45 feet deep and discharges its water from the penstock into a low head of water 45 feet below the reservoirs head of water, then current hydroelectric power plants can only have a penstock of approximately 45 feet or less. Thus, the most head of water any current hydroelectric power plant could possibly use to generate power, under those conditions, is limited to a depth of 45 feet. Given the same conditions, location, 50-foot dam, the same size reservoir with a depth of 45 feet and discharges its water from the penstock with the same diameter into a low head of water 45 feet below the reservoirs head of water, then the invented system can have a penstock far longer than 45 feet. Under the same conditions such as but not limited to: the same location, 50-foot dam, the same size reservoir with a depth of 45 feet and discharges its water from a penstock with the same size diameter into a low head of water 45 feet below the reservoirs head of water, it is possible for the invented system to have a penstock with a length between (0 to 200 feet or longer). This allows the invented system to generate more power (electricity) than current hydroelectric power plants are capable of generating, given the same conditions.

Since the invented system and its variations use a pressure differential based upon a high head of water and a low head of water to move water through the system hydrostatic pressure (gravity) moves the water. This saves energy and gives the invented system efficiencies that compare or exceed traditional hydroelectric power plants including hydroelectric pump storage power plants (HEPS Power Plants). The pressure differential can be a result of natural conditions such as but not limited to topography. manmade design (altering the landscape) and or the intervention of man-made devices such as but not limited to: dams, reservoirs, water towers, canals, locks (like the ones on the St.

Lawrence Seaway and the Panama Canal), pipes, and ditches and the pressure differential can be derived from a combination of natural and man-made causes.

Natural sources of water include but are not limited to an ocean, lake, river, spring, stream, wave action, tides or run-off water. Man-made water supplies include but are not limited to dams/reservoirs, water towers, canals, tanks, pipes, ditches or wells. The water can, also, come from any combination of natural or man-made sources.

Some of the inventions variations do use a pump system and if desired one or more pump systems can be added to any of its variations. If desired or necessary, a pump system can be added to the invented system to help move water through the system and/or to help evacuate water from the system. Some variations may need to pump water from a point of discharge, like a connecting pipe, an evacuation chamber and/or some other area. Note that, for the purposes of this disclosure, venturi systems and E-jector-transvac ejector technology are consider pump systems.

Given the same conditions such as but not limited to: head of water, location, topography and whether or not a dam/reservoir system is used, the invented system and its variations can have a penstock considerably longer than current hydroelectric power plants. This means the invented system can generate more power (electricity) than current hydroelectric power plants using the same head of water. It follows that invented system can be placed at sites where it was previously not practical to build a hydroelectric power plant because the amount of electricity generated was not cost effective.

The invented system can be built (with or without) using a dam and a reservoir. However, if a dam/reservoir system is desired and/or required, then the invented systems can be built using a smaller dam and reservoir system and generate a wide range of power even more power than a traditional hydroelectric power plant can generate at that site. Therefore, the invented system and its variations can be built in locations where it was previously not practical to build a hydroelectric power plant because of the cost effectiveness, topography, environmental concerns and the loss of land/property.

The invented system can be used to replace existing hydroelectric power plants to provide more power generation. If desired an existing hydroelectric power plant can be replaced with the invented system to reduce the size of a dam and reservoir system and still generate the same amount or a greater amount of power (electricity).

The applicant's prior work (patents) illustrates how to add components (more return stations) to this type of power plant to supply water to the penstock continuously. This would allow the invented system to generate power continuously. Currently, without adding return stations to supply the penstock with a continuous supply of water, the invented system would generate intermittent power. This is because if there is only one return station supplying water to the penstock, then as they are moving up and down to supply water to the penstock and to be refilled with water, there would be no water being supplied to the penstock.

The high head of water can be supplied by a natural source of water, a man-made source of water and a combination of natural and man-made sources of water.

When water is discharged from the invented system, it can be evacuated into a low head of water the same high head of water supplying the power plant or a combination of being evacuated into a low head and the high head.

When water is evacuated back into the original head of water, it is acting like a hydroelectric pump storage power plant. The difference between a traditional (HEPS Power Plant) and the (EHPG pump Storage Power Plant) is that a pump storage version of the invented system can operate for longer period of time and even continuously when the applicant's prior patented work involving adding one or more return stations to the power plant to supply a continuous supply of water to the penstock (PS) is included in the design.

The invented system can operate with or without a dam/reservoir system and under the same conditions for any location it can have a longer penstock giving it greater power generation capabilities than traditional hydroelectric power plants. If a dam/reservoir is used for the invented system, then a smaller dam/reservoir system can be used to generate a wide range and even more power (electricity) compared to a traditional hydroelectric power plant.

Given the aforementioned characteristics of the invented system, it can be built in locations that previously were not conducive to building a traditional hydroelectric power plant.

The invented system can also replace current hydroelectric power plants to match or increase their power generation and or to reduce the intrusion into environmental/habitat concerns by reducing the size of the dam/reservoir system.

Components of the invented system can be used to modify existing hydroelectric power plants to increase their power generation and/or to reduce the intrusion into the environment/habitat.

Water entering the invented system can be discharged from the invented system using a venturi system and/or an ejector system (Transvac Ejector technology).

There are numerous variations of the invented system that are described in this document. They all require a high head of water and a low head of water to generate a pressure differential to move water back and forth in an up and down wave action through the invented system. The pressure differential can come from a natural source of water, a man-made source of water or a combination of a natural and man-made source of water.

The invented system and methods of perform work using a combination of manmade devices and a fundamental force of nature, gravity. The work is used to operate a turbine and a generator to generate electricity. The work can also be used to operate other machines like but not limited to pumps, saws and mechanisms that lift and lower things. Examples of this can be seen in my prior work. Gravity, in the form of a pressure differential, is used to help operate the system. The pressure differential can be from various sources such as but not limited to liquids, gases, solids and/or any combination of those elements. This document focuses on using water to generate the pressure differential in order to generate power (electricity). The water can be from any natural source such as but not limited to an ocean, lake, river, spring, stream, wave action, tides or run-off water. The water can also come from man-made water supplies such as but not limited to dams/reservoirs, canals, tanks, pipes, ditches or wells. The water can come from any combination of natural or man-made sources, as well.

The information contained in this document is used to describe the invented system's method for generating power for illustrative and teaching purposes only. Accordingly, the illustrations are not drawn to proper proportions/specifications. The drawings in this document serve to merely show how the system operates. The actual design for any of these types of power plants needs to be calculated and tested by an expert in the relevant arts to attain the best efficacy and/or desired outcome. The order of operating (opening and closing) vents and valves needs to be calculated and tested by an expert in the relevant arts.

Many of the components necessary to operate these types of power plants are not included in the diagram. However, they are necessary and implied. Some of these components may include but are not limited to the following items: a structural frame to support the power plant, computers, solenoids, smart boards, generators, a system to carry electricity from the power plant to its destination (power transmission system), maintenance access portals and a battery storage system. Maintenance portals include but are not limited to entry ports for technicians to repair and maintain the system. They also include portals to fill and to drain the different relevant areas of the power plant. The applicant's prior work demonstrates how to adapt the invented system to allow it to run continuously. Those adaptations can be applied to the invented system, too. Again, this document's goal is to explain how the invented system and its variations function. Accordingly, the actual design of any of these types of power plants and the design of any adaptations/variations will need to be calculated and tested by an expert in the relevant arts to achieve the highest and/or the desired amount of efficiency. Additionally, the order of operating (opening and closing) vents and valves needs to be calculated and tested by an expert in the relevant arts.

It should be noted that the relationship between the invented system and its surrounding environment can vary depending upon the desired outcome and the geography. Thus, the invented system can be built above ground, below ground, (partially above and partially below) ground. Likewise, the invented system can be built above water, below water and (partially above and partially below) water. The invented system can also be built inside a container.

It is an object of this invention to provide systems and methods for renewable sources of power generation of the types generally described herein, being adapted for the purposes set forth herein, and overcoming disadvantages found in the prior art. These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which:

FIG. 34A is an elevation view of a thirty-first exemplary embodiment of the invented power generation system;

FIG. 34B is an elevation view of an embodiment of a delivery system variation for use in connection with exemplary embodiment of the invented power generation system shown in connection with FIG. 34A;

FIG. 34C is an elevation view of a further embodiment of a delivery system variation for use in connection with exemplary embodiment of the invented power generation system shown in connection with FIG. 34A;

DETAILED DESCRIPTION OF THE INVENTION

Figure 1:
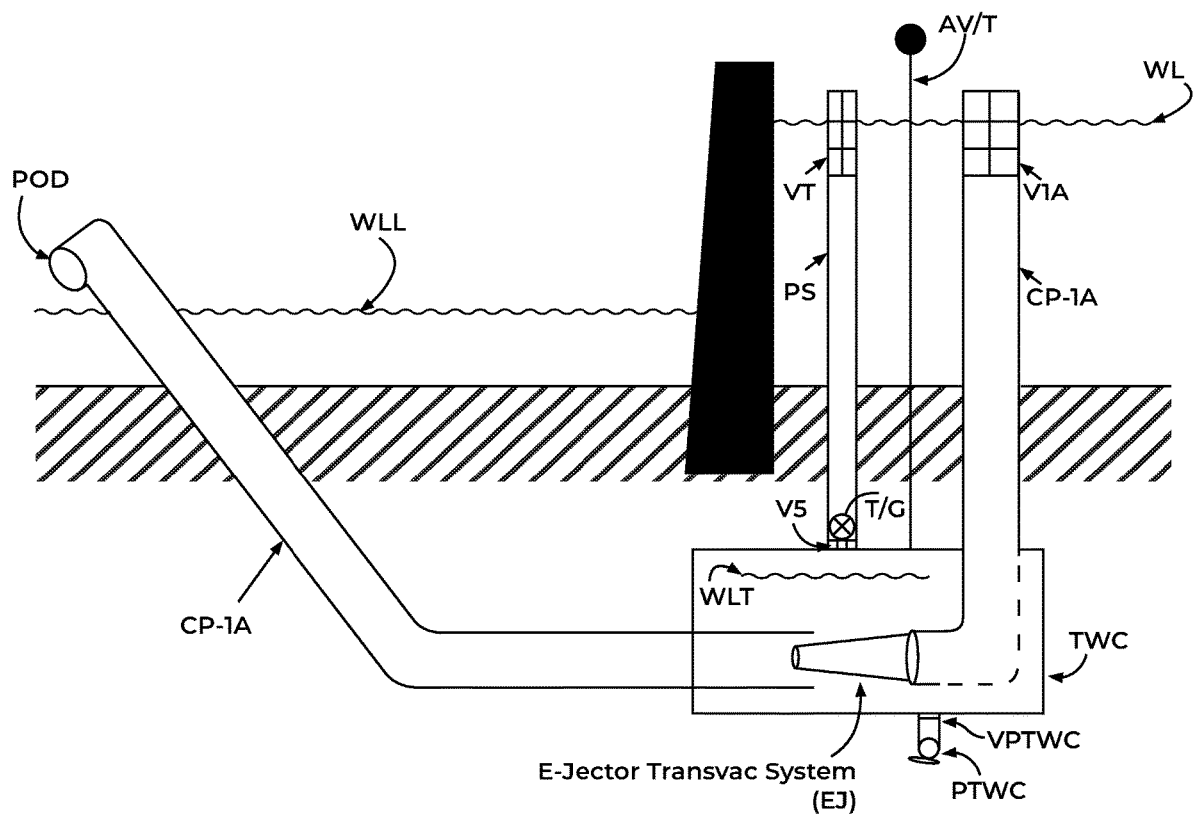
FIG. 1 is an elevation view of a first exemplary embodiment of the invented power generation system.

An exemplary embodiment of the present invention is shown in connection with FIG. 1. In this embodiment, the invention operates as a hydroelectric power source in supplementation to a traditional hydroelectric dam. In effect, the exemplary embodiment shown here utilizes the differential in the water levels found up- and down-stream of the dam's location in combination with "flow pump", "vacuum" or "vacuum pump" systems to increase the effective head experienced through a turbine system situated in a penstock (separately from the dam system's turbine system, if applicable), thereby generating power. It will be understood that—while several exemplary embodiments of the present disclosure are presented with electrical generation turbine systems as a primary means of performing work—the systems and methods so disclosed may be readily adapted by those skilled in the art for other means, such as but not limited to, lifting items, pumping liquids/gases/solutions and operating mechanisms such as a saw, mill, or other devices generally requiring a force input.

In FIGS. 1-4, exemplary flow pump systems are incorporated into the embodiments as a means for utilizing the high head of water to assist in maintaining a consistent flow rate of the working fluid out of the turbine water chamber component and thus through the power-generating penstock component. For instance, liquid eductors, jet pumps systems (an E-Jector/Transvac ejector technology system, for example) or venturi systems can be used to evacuate water/liquids or gasses from the relevant components of the system as needed. The actual physical design of these high-low pump systems used will therefore be readily applied as deemed suitable by those skilled in the art for particular applications and shall not be considered to limit the scope of the claimed invention unless so specifically stated (e.g., in form or exact dimensions). Vacuum pumping systems (such as but not limited to: vacuum pumps, venturi systems, eductors and ejector technology systems) can be used to evacuate the working fluids from the system. Note that there are various methods to employ jet pump and venturi-type systems to evacuate working fluids from the system, and the scope of the invention should therefore not be considered limited by the following examples.

As illustrated in FIG. 1, ejector systems can be used to evacuate water from the invented system after it was used to generate power (electricity). This scenario uses a high-pressure liquid (like but not limited to water) to evacuate a liquid (like but not limited to water) from the invented system. This is a very efficient method for pumping water out of the invented system. The exemplary embodiment shown is depicted as employing a single-unit ejector system, but it will be understood by those skilled in the art that multiple ejector units in series, parallel or combinations thereof may be employed to better suit an embodiment of the invention for a particular application. In general, references to or illustrations of vacuum systems herein should be interpreted to cover one or more vacuum system components generally, unless otherwise specified.

A method of operation for ejector systems that have water entering through valve (V1A) are illustrated as follows: valve (VT) is opened allowing water from the high head (WL) to enter the penstock (PS). Valve (V5) is opened allowing water in (PS) to pass through the turbine/generator system (T/G) to generate power. Air vent (AV/T) is opened. Valve (V1A) is opened. Valves (VT), (V5), (V1A) and air vent (AV/T) preferably remain open during normal plant operation. However, any of those can be opened and closed as necessary for desired operation.

Water from the high head of water (WL) enters connecting pipe (CP-1A) through valve (V1A). It travels down to the ejector system (EJ). The nozzle effect from the ejector system (EJ) takes effect. Since the water in (TWC) is vented to atmosphere by (AV/T) it is low pressure water. Since the column of water in (CP-1A) entering (EJ) is higher than the column of water in the (TWC), the water entering the (EJ) system from (CP-1A) is at a higher pressure than the water in the (TWC). Thus, the entrained fluid in the (TWC) commingles with the water in (CP-1A). Connecting pipe (CP-1A) now carries water from the high head of water (WL) and water from the (TWC) up to and out of the invented system's point of discharge (POD) into the low head of water (WLL).

The point of discharge (POD) can be above, below or at the low head of water (WLL). Its exact location will need to be calculated and tested by an expert in the appropriate art. If required, the water pressure in the (TWC) can be controlled by opening and closing (AV/T). Closing (AV/T) builds up back pressure causing the water in (TWC) to be raised to a higher pressure. Opening (AV/T) can lower the water pressure in the (TWC) to atmospheric pressure.

A pump system (PTWC) may be optionally added to any (TWC) to evacuate water if necessary. Valve (VPTWC) may be opened when pump (PTWC) is in operation but closed when it is not pumping.

Figure 2:
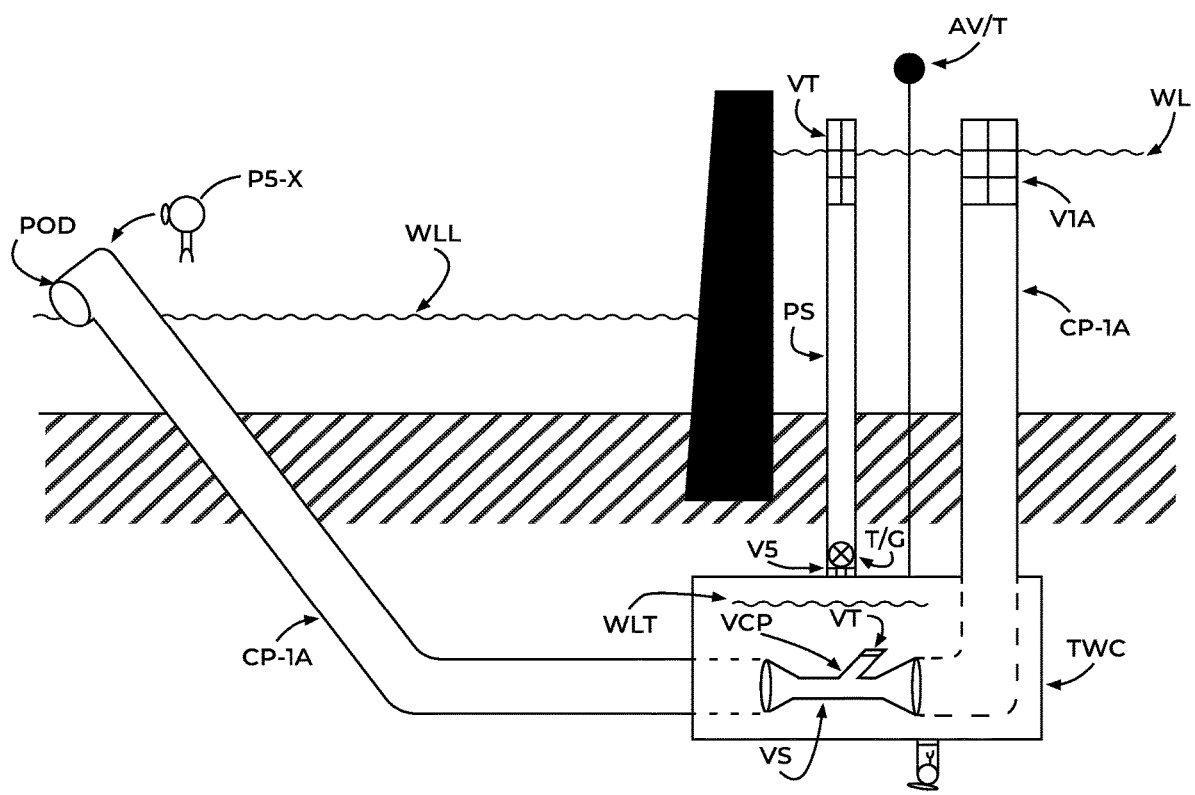
FIG. 2 is an elevation view of a second exemplary embodiment of the invented power generation system.

FIG. 2 is used to explain how a venturi-type vacuum pump system is used to evacuate water from the invented system using water. The pressure differentials between the water being evacuated from the (TWC) and the water entering valve (V1A) can vary. As shown in connection with FIG. 1, in this exemplary embodiment a dam is used to generate a pressure differential between the high head of water (WL) and the low head of water (WLL). This allows for greater power generation and in some instances, allows for a greater pressure differential between the water in the (TWC) and the water entering (CP-1A) via valve (V1A).

Venturi vacuum pump systems that use water (or liquids generally) can be used to evacuate water from the invented system after that water was used to generate power. In this example, high pressure water is used to evacuate a lower pressure water. This is a very efficient method for evacuating water out of the invented system and provides for an increased effective head experienced by the penstock. This is especially useful, for example, in retrofitting low-head dams or reevaluating low-head dam project sites for new hydroelectric power plants.

A method of operation for venturi vacuum pump systems is illustrated as follows in connection with the exemplary embodiment shown in connection with FIG. 2: valve (VT) is opened allowing water from the high head (WL) to enter the penstock (PS). Valve (V5) is opened allowing water in (PS) to pass through the turbine/generator system (T/G) to generate power. Air vent (AV/T) is opened. It vents the air space in the (TWC) to atmosphere. Valve (V1A) is opened. Valve (VV) is opened. Valves (VT), (V5), (V1A), (VV) and air vent (AV/T) preferably remain open during normal plant operation. However, any of those can be opened and closed as necessary for desired operation.

Water from the high head of water (WL) enters connecting pipe (CP-1A) through valve (V1A). It travels down to the venturi vacuum pump system (VS). Since the water in (TWC) is vented to atmosphere by (AV/T) it is low pressure water. Since the column of water in (CP-1A) entering (VS) is higher than the column of water in the (TWC), the water entering the (VS) system from (CP-1A) is at a higher pressure than the water in the (TWC). The venturi effect takes place, in which the low-pressure water in the turbine water chamber (TWC) passes through valve (VV) and commingles/mixes with the water from (CP-1A) via a connecting pipe (VCP). Connecting pipe (CP-1A) now carries water from the high head of water (WL) and water from the (TWC) up to and out of the invented system's point of discharge (POD) into the low head of water (WLL).

Note that the point of discharge (POD) can be above, below or at the low head of water. Its exact location should be calculated and tested by an expert in the appropriate art for a particular application. Furthermore, an optional pump system (PS-X) can be added at the point of discharge (POD) to help evacuate water from the invented system.

Figure 3:
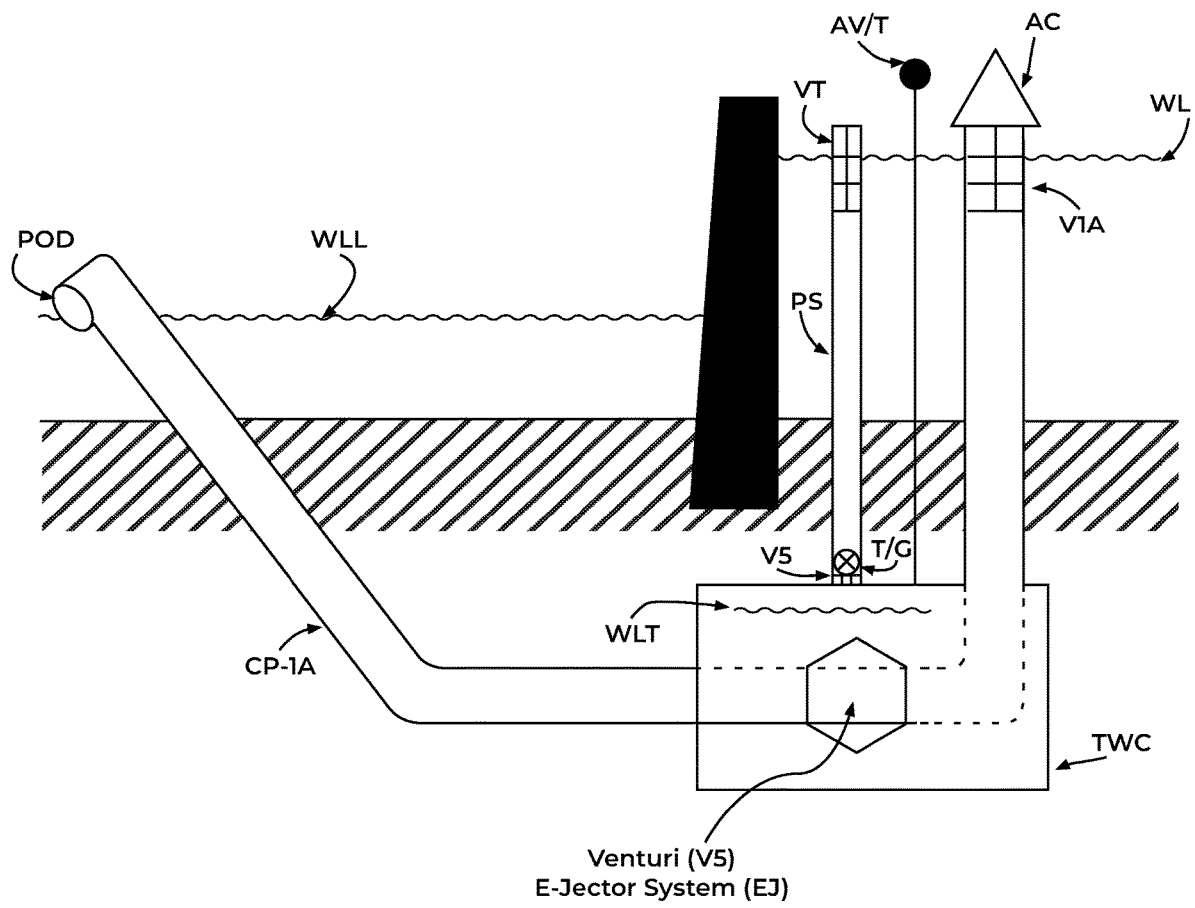
FIG. 3 is an elevation view of a third exemplary embodiment of the invented power generation system.

The exemplary embodiment shown in connection with FIG. 3 depicts a vacuum pump system that incorporates the use of air (or other gasses). This scenario uses high pressure air to evacuate lower pressure water. A system/device (AC) is required to pressurize the air entering through valve (V1A). This example uses an air compressor (AC) to compress the air entering valve (V1A), however, other systems can be used to compress the air entering valve (V1A).

Note that dams are not required for the vacuum pump system embodiments if the head of water entering through valve (V1A) is sufficient to operate the system. Given the same head of water enters through valves (VT) and (V1A), that water can be evacuated into the same head of water. Additionally, whether or not a dam is used in vacuum pump systems a pumping system can be added at the point of discharge (POD) to help evacuate water from the invented system.

FIG. 3 illustrates an exemplary embodiment of the method of operation for gas-type vacuum pump systems. When an air compressor (AC) is used to compress air entering valve (V1A) the method of operation is the same as when water is entering through valve (V1A) with the following exceptions: (1) only compressed air enters through valve (VIA); (2) water from the turbine water chamber (TWC) mixes with air from (CP-1A) because of the venturi effect; and (3) connecting pipe (CP-1A) carries water and air up to and out of the (POD).

When an air compressor (AC) is used to compress air entering valve (V1A) the method of operation for an ejector system (EJ) is the same as when water is entering through valve (V1A) with the following exceptions: (1) only compressed air enters through valve (V1A); (2) water from the turbine water chamber (TWC) mixes with air from (CP-1A) because of the nozzle effect; and (3) connecting pipe (CP-1A) carries water and air up to and out of the (POD). The same is true for any other comparable vacuum pump systems, wherein the specific vacuum pump system applied in a given application of the invention involves a vacuum pump effect, generally. Note also that in this example water does not enter connecting pipe (CP-1A) through valve (V1A). Only compressed air from air compressor (AC) enters through valve (V1A).

Since an air compressor is used in this exemplary embodiment to cause the venturi effect or the nozzle effect a dam is not strictly required, as will be evident upon the disclosure of further embodiments herein below. Water entering through valve (VT) to generate power (perform work, generally) can be discharged at the system's (POD) into the same head of water entering through valve (VT). A dam is used to increase the pressure differential between the matter entering through valve (V1A) and the water inside of the (TWC). A dam also allows a greater power generation.

Figure 4:
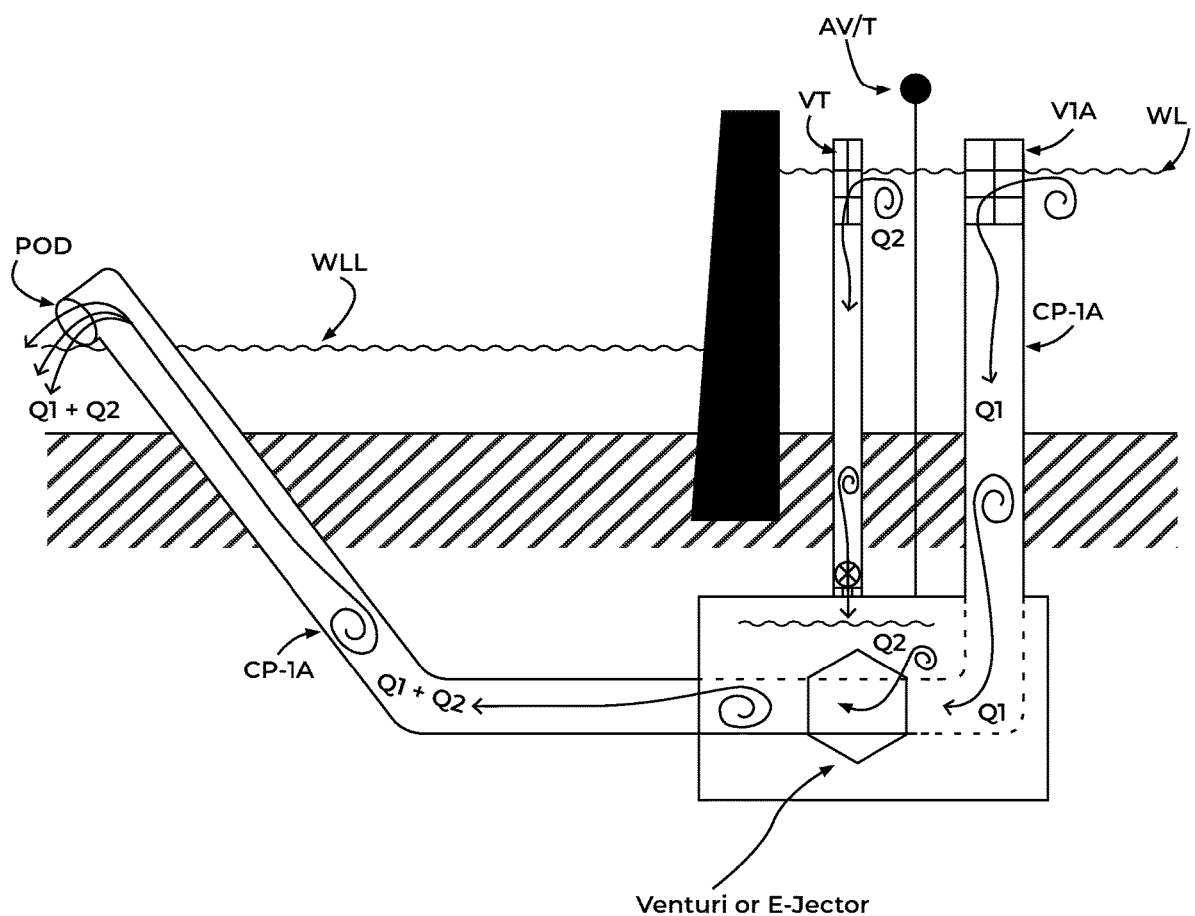
FIG. 4 is another view of the embodiment shown in connection with FIG. 3 depicting exemplary flow throughout the system.

FIG. 4 depicts the water flow through the invented system for venturi, ejector, eductor and similar comparable systems as described in connection with FIGS. 1-3. FIG. 4 uses the same symbol shown in connection with FIG. 3 to represent vacuum pump systems generally, such as venturi, ejector and eductor systems and the like.

Q1 represents the flow of water passing through connecting pipe (CP-1A) after it passed through valve (V1A). Q2 signifies the flow of water that entered through valve (VT), passed through the turbine/generator system and was dropped into the turbine water chamber (TWC) after generating power. Flow (Q1+Q2) indicates the flow of water after the venturi effect in a venturi system, the nozzle effect in an ejector system, or other comparable vacuum pump systems. Flow (Q1+Q2) illustrates the mixing of matter/water between the water in the turbine water chamber (TWC) and the water that entered via valve (V1A).

Figure 5:
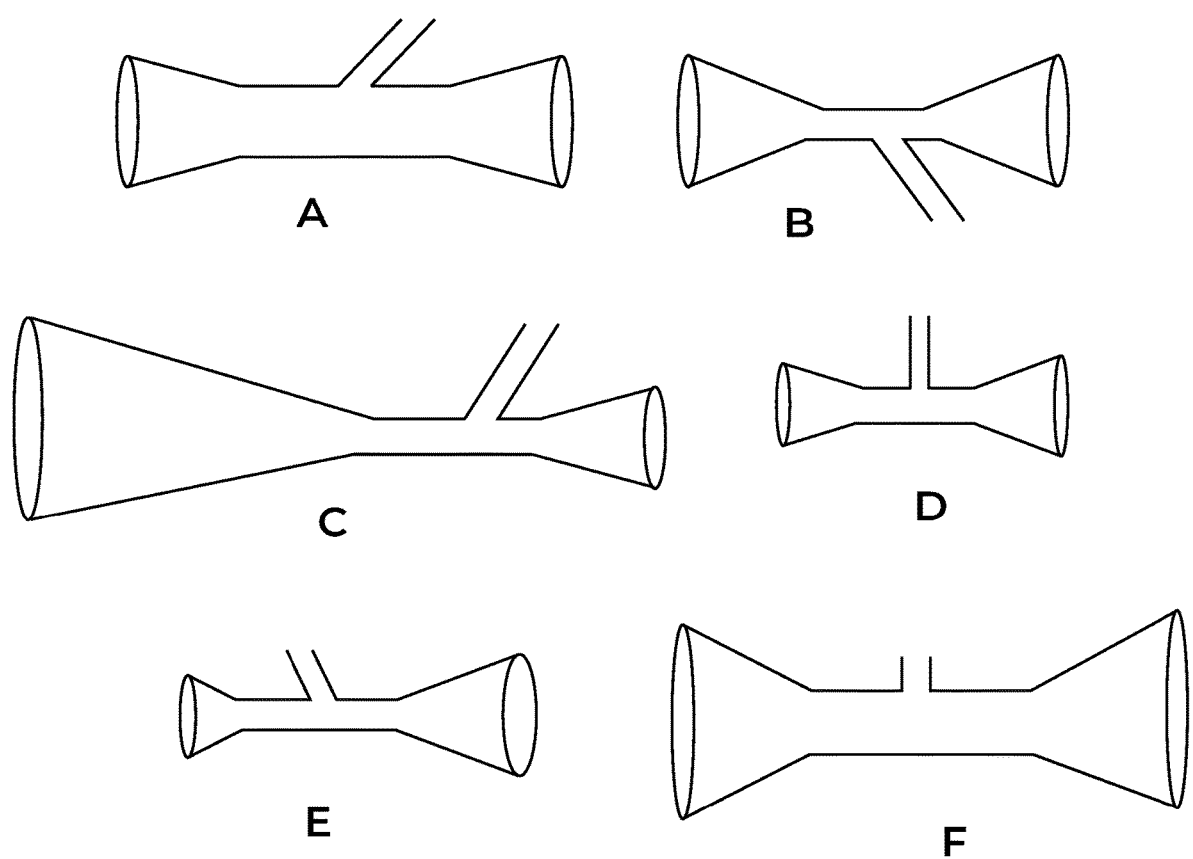
FIG. 5A illustrates an exemplary venturi design for use in connection with applications of the invented power generation system.
FIG. 5B illustrates an exemplary venturi design for use in connection with applications of the invented power generation system.
FIG. 5C illustrates an exemplary venturi design for use in connection with applications of the invented power generation system.
FIG. 5D illustrates an exemplary venturi design for use in connection with applications of the invented power generation system.
FIG. 5E illustrates an exemplary venturi design for use in connection with applications of the invented power generation system.
FIG. 5F illustrates an exemplary venturi design for use in connection with applications of the invented power generation system.

FIG. 5 illustrates various venturi designs signifying that these design variations as with other pump systems such as but not limited to jet pumps (ejector pumps), hammer pumps, double hammer pumps, and centrifugal pumps are too numerous to describe and/or depict. In these examples—intended for illustrative purposes—FIGS. 5A, 5B, 5C and 5D illustrate angled low-pressure inlets in various configurations, as well as a variety of exemplary inlet and outlet cone widths. In some embodiments, the angle of the low-pressure inlet with respect to the horizontal may impact the efficiency of the vacuum effect and thus the overall system efficiency. FIG. 5E is an exemplary embodiment of a venturi design with a perpendicularly oriented low-pressure inlet and with a smaller relative diameter, and FIG. 5F depicts a similarly-configured perpendicular low-pressure inlet with a relatively shorter overall length, coupled with larger inlet and outlet cones.

Figure 6:
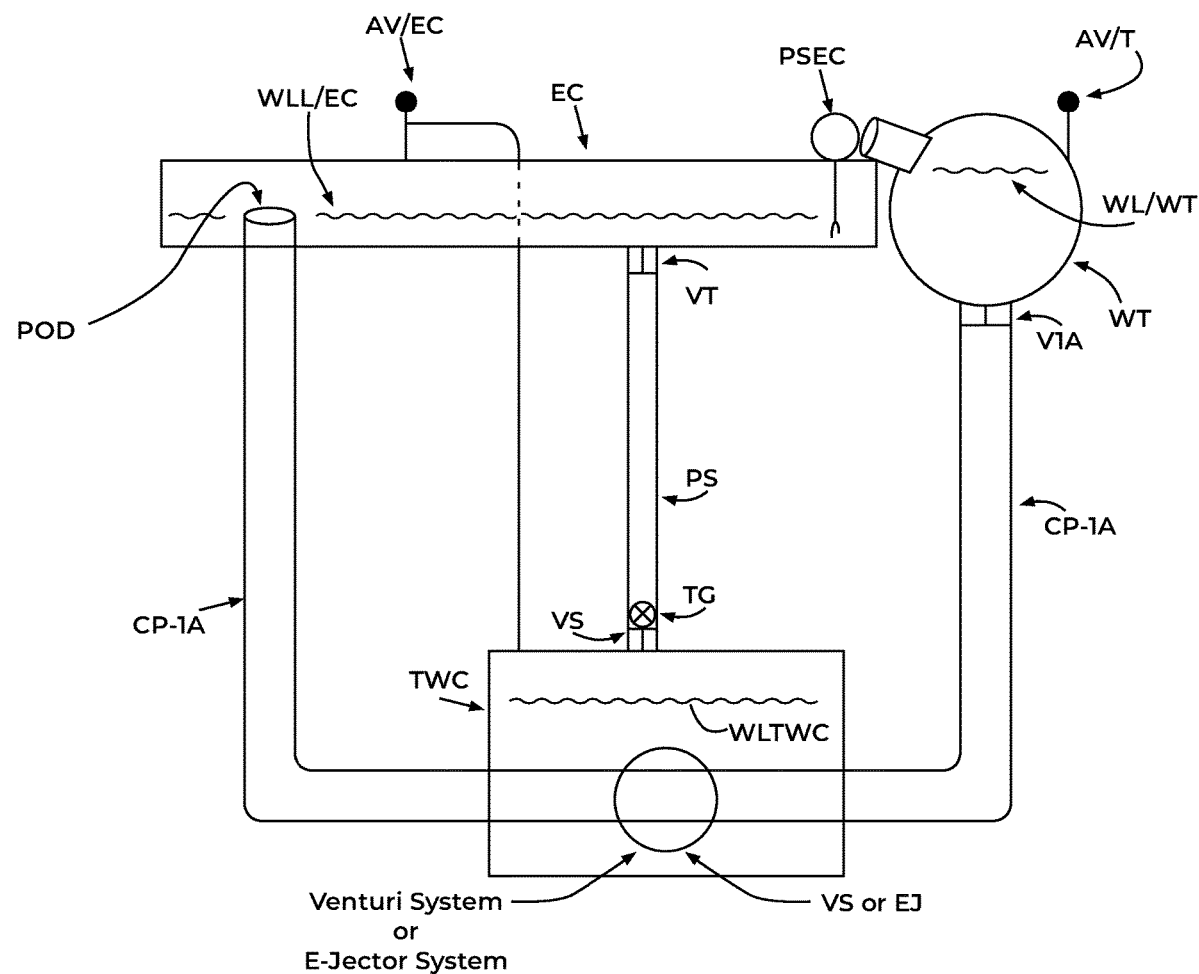
FIG. 6 is an elevation view of a fourth exemplary embodiment of the invented power generation system.

The exemplary embodiment shown in connection with FIG. 6 illustrates that venturi (VS), ejector technology (EJ) and other such vacuum pump systems can use a water tower or similar apparatus to supply water to the invented system. This allows the invented system to be built anywhere a water tower can be built even far away from a natural source of water. Its water supply can be piped in or transported in by trucks, trains, aircraft and other forms of transportation/delivery. Theoretically, as long as it has gravity or artificial gravity, it has extraterrestrial applications, as well. This allows the invented system to be built in locations such as but not limited to: space stations, extraterrestrial colonies, (underwater/underground complexes) above ground level, below ground level, above water level, below water level, partially above and partially below ground level, as well as, partially above and partially below water level.

In operation, the exemplary embodiment shown in connection with FIG. 6 can be operated as follows: preferably, air vents (AV/EC) and (AV/T) are open during normal plant operations. Preferably, valves (VT), (V5), (V1A) and (VV) are open during normal system operations (valve (VV) is depicted in FIG. 2 in connection with the venturi vacuum pump system). Any of those vents and valves can be opened and closed as necessary. The high head of water in this scenario is (WL/WT) located in the water tower. The low head of water (WLL/EC) is located in the evacuation chamber (EC). Since the point of discharge (POD) is at or below (WLL/EC), (WLL/EC) becomes the low head of water.

Water from water tower (WT) passes through valve (V1A) and enters connecting pipe (CP-1A). It travels down to venturi system (VS). Water from the evacuation chamber (EC) passes through valve (VT) and down the penstock (PS) to turbine/generator (T/G) where it generates power. Then that water passes through valve (V5) and drops into the turbine water chamber (TWC), which is vented to atmosphere by air vent system (AV/EC). (AV/EC) also vents evacuation chamber (EC) to atmosphere. Likewise, air vent (AV/T) vents the water tower (WT) to atmosphere. There can be an air space in the turbine water chamber (TWC) between valve (V5) and the water level in the (TWC). The water level in (TWC) is designated as (WLTWC). As water from (CP-1A) passes through venturi system (VS) the venturi effect takes place and water from the (TWC) passes through valve (VV) and connecting pipe (VCP) and mixes with the water from (CP-1A). Connecting pipe (VCP) is depicted in FIG. 2 for venturi vacuum pump system embodiments. Since the column of water entering the venturi system (VS) has a higher head of water than the water inside of (TWC), the water from (CP-1A) has a higher pressure. The combined flow of water exiting the venturi travels up connecting pipe (CP-1A) and out of the point of discharge (POD) located in the evacuation chamber (EC). Pump system (PSEC) pumps water from (EC) back into the water tower (WT) preferably at the same rate as the water exiting the water tower (WT) through valve (V1A). Preferably, water from (EC) drops down (PS) at the same rate that water exits the (TWC) through the venturi system (VS). Again, valve (VT) and/or valve (V5) control the flow of water down (PS) and valve (V1A) controls the flow of water entering connecting pipe (CP-1A). The amount of water entering the penstock and entering connecting pipe (CP-1A) will need to be calculated and tested by an expert in the appropriate arts to determine the desired efficiency. This holds true for all variations contained in this document.

In ejector technology systems (EJ): preferably, air vents (AV/EC) and (AV/T) are open during normal plant operations. Preferably, valves (VT), (V5) and (V1A) are open during normal system operations. Any of those vents and valves can be opened and closed as necessary. The high head of water in this scenario is (WL/WT) located in the water tower. The low head of water (WLL/EC) is located in the evacuation chamber (EC). Since the point of discharge (POD) is at or below (WLL/EC), (WLL/EC) becomes the low head of water.

Water from water tower (WT) passes through valve (V1A) and enters connecting pipe (CP-1A). It travels down to ejector system (EJ). Water from the evacuation chamber (EC) passes through valve (VT) and down the penstock (PS) to turbine/generator (T/G) where it generates power. Then that water passes through valve (V5) and drops into the turbine water chamber (TWC), which is vented to atmosphere by air vent system (AV/EC). (AV/EC) also vents evacuation chamber (EC) to atmosphere. Likewise, air vent (AV/T) vents the water tower (WT) to atmosphere. There is an air space in (TWC) between valve (V5) and the water level in the (TWC). The water level in (TWC) is designated as (WLTWC). As water from (CP-1A) passes through ejector system (EJ) the nozzle effect takes place and water from the (TWC) mixes with the water from (CP-1A). Since the column of water entering the ejector system (EJ) has a higher head of water than the water inside of (TWC), the water from (CP-1A) has a higher pressure. The combined flow of water exiting (EJ) travels up connecting pipe (CP-1A) and out of the point of discharge (POD) located in the evacuation chamber (EC). Pump system (PSEC) pumps water from (EC) back into the water tower (WT) preferably at the same rate as the water exiting the water tower (WT) through valve (V1A). Preferably, water from (EC) drops down (PS) at the same rate that water exits the (TWC) through the ejector system (EJ). Again, valve (VT) and/or valve (V5) control the flow of water down (PS) and valve (V1A) controls the flow of water entering connecting pipe (CP-1A).

Note that if necessary, a valve can be added to the ejector system (EJ) to control the flow of water between it and the turbine water chamber (TWC).

Figure 7:
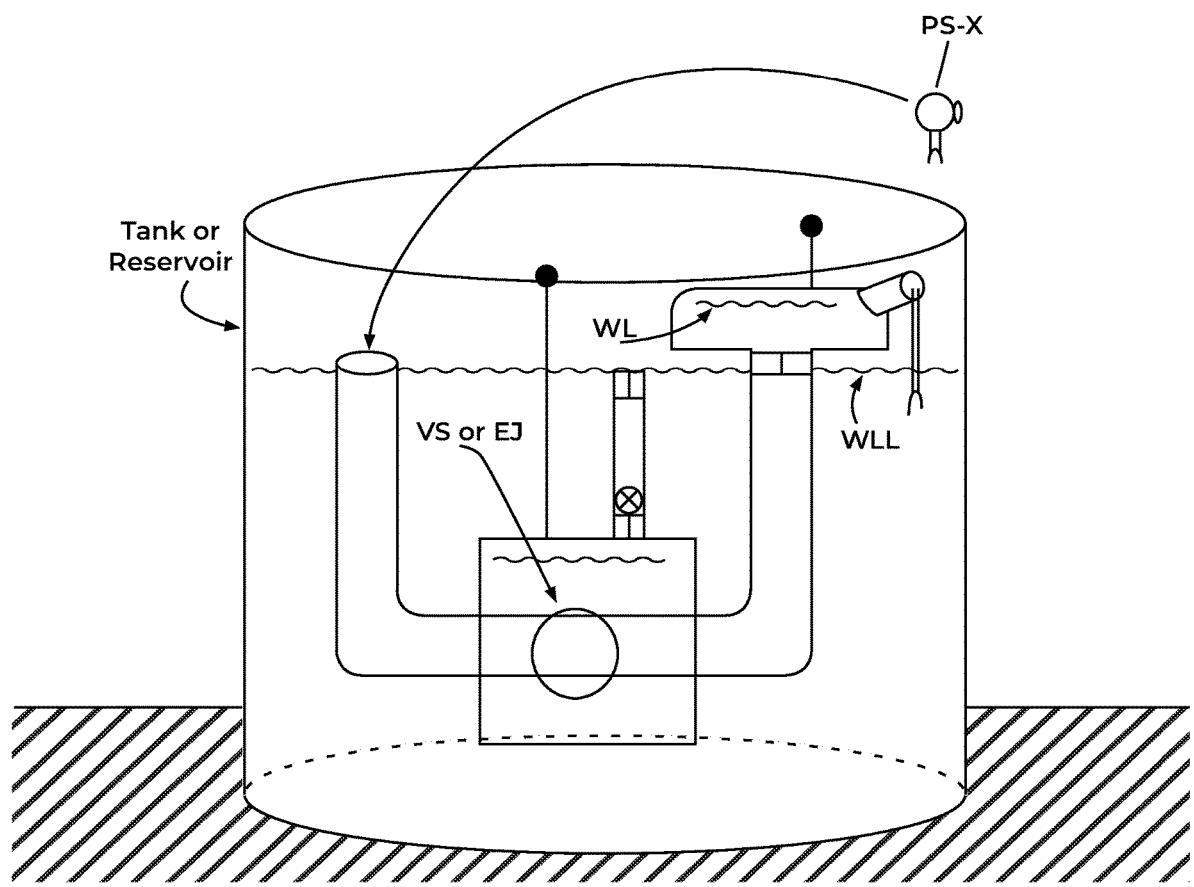
FIG. 7 is an elevation view of a fifth exemplary embodiment of the invented power generation system.

The embodiment shown in connection with FIG. 7 illustrates that any system can be placed in a tank, reservoir or container system. This allows the power plant to operate in places like but not limited to: above ground, below ground and below water. This embodiment also illustrates that a water tower/container (WT) can provide the high head of water (WL). Optionally, a pump system (PS-X) can be added to the point of discharge (POD) if necessary, desired or appropriate for a given application.

Figure 8:
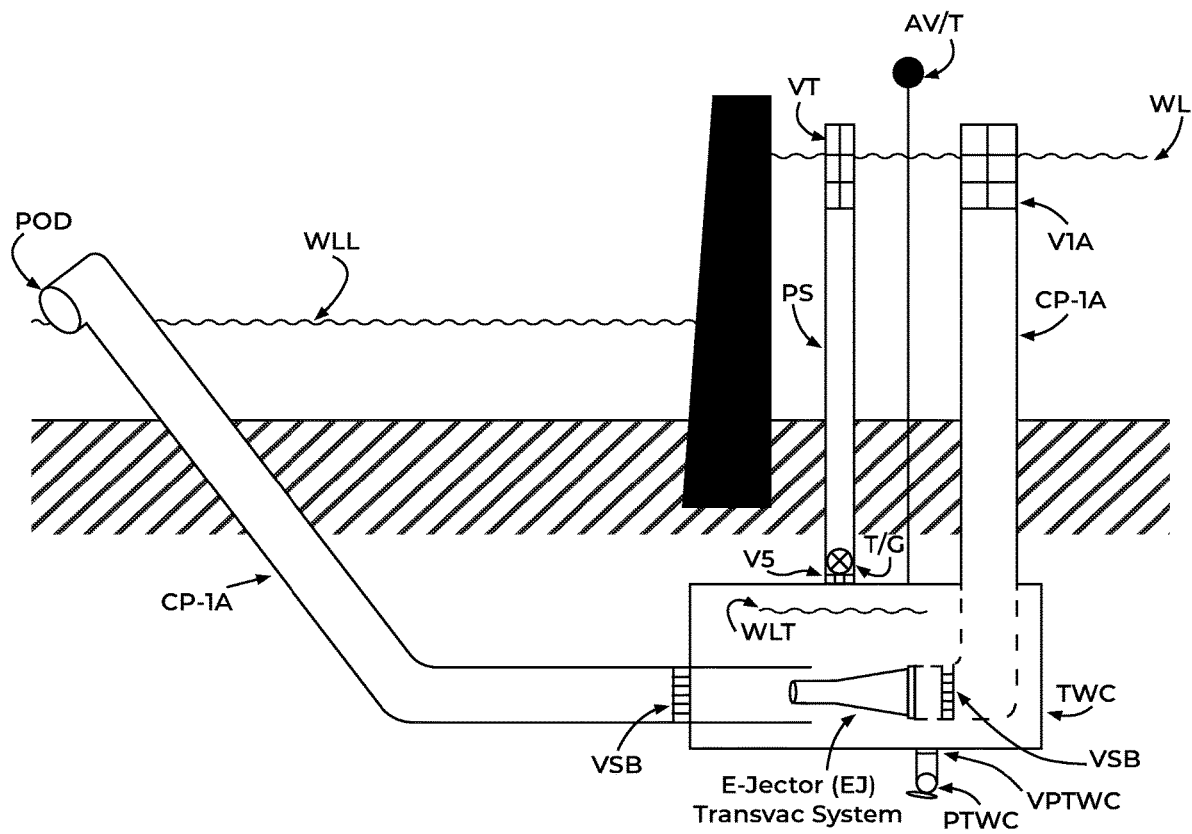
FIG. 8 is an elevation view of a sixth exemplary embodiment of the invented power generation system.

The embodiment shown in connection with FIG. 8 includes a mixing chamber valve system (VSB) to prevent water in connecting pipe (CP-1A) backing up into the turbine water chamber (TWC) when the power plant is not in operation. Valve (VPTWC) can be opened and closed as necessary to allow pump system (PTWC) to evacuate water for the (TWC) as needed.

Figure 9:
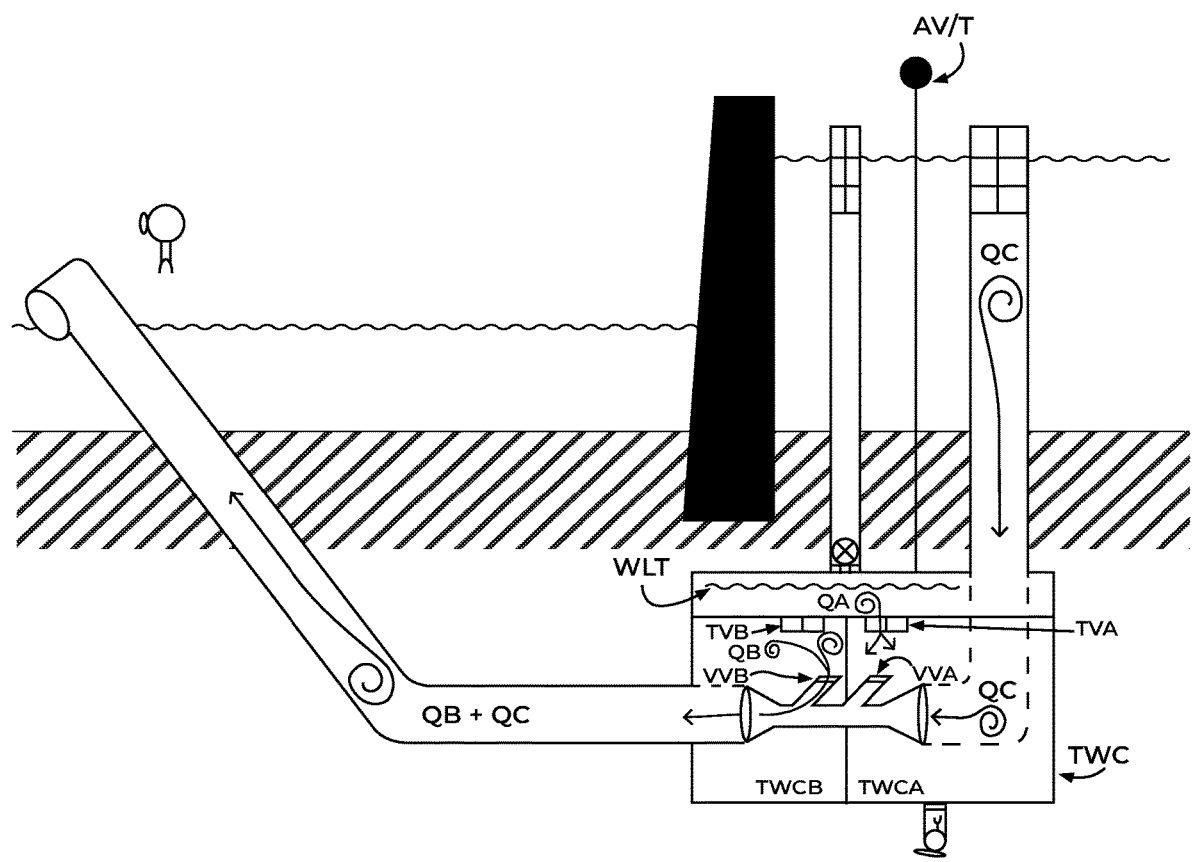
FIG. 9 is an elevation view of a seventh exemplary embodiment of the invented power generation system.

FIG. 9 depicts an embodiment wherein the water entering the venturi system does not need to be vented to atmosphere. However, if desired or necessary they can be by adding an air vent to (TWCB) and (TWCA). FIG. 9 shows how to achieve continual power generation if you wish to supply water from the turbine water chamber via (TWCB) and (TWCA). (TWCB) and (TWCA) are not vented to atmosphere in this embodiment.

This embodiment also illustrates that there can be more than one turbine water chamber supplying water to the vacuum pump system (VS). Although the (TWC) is vented to atmosphere by air vent (AV/T) both (TWCB) and (TWCA) are not vented to atmosphere in this scenario. As (TWCA) is being refilled with water from the penstock via valve (TVA), (TWCB) is supplying water to the venturi via valve (VVB). Valve (TVB) is closed when valve (VVB) is open and valve (VVA) is closed when valve (TVA) is opened. This shows how to operate this variation of the invented system with little if any intermittent power generation.

Figure 10:
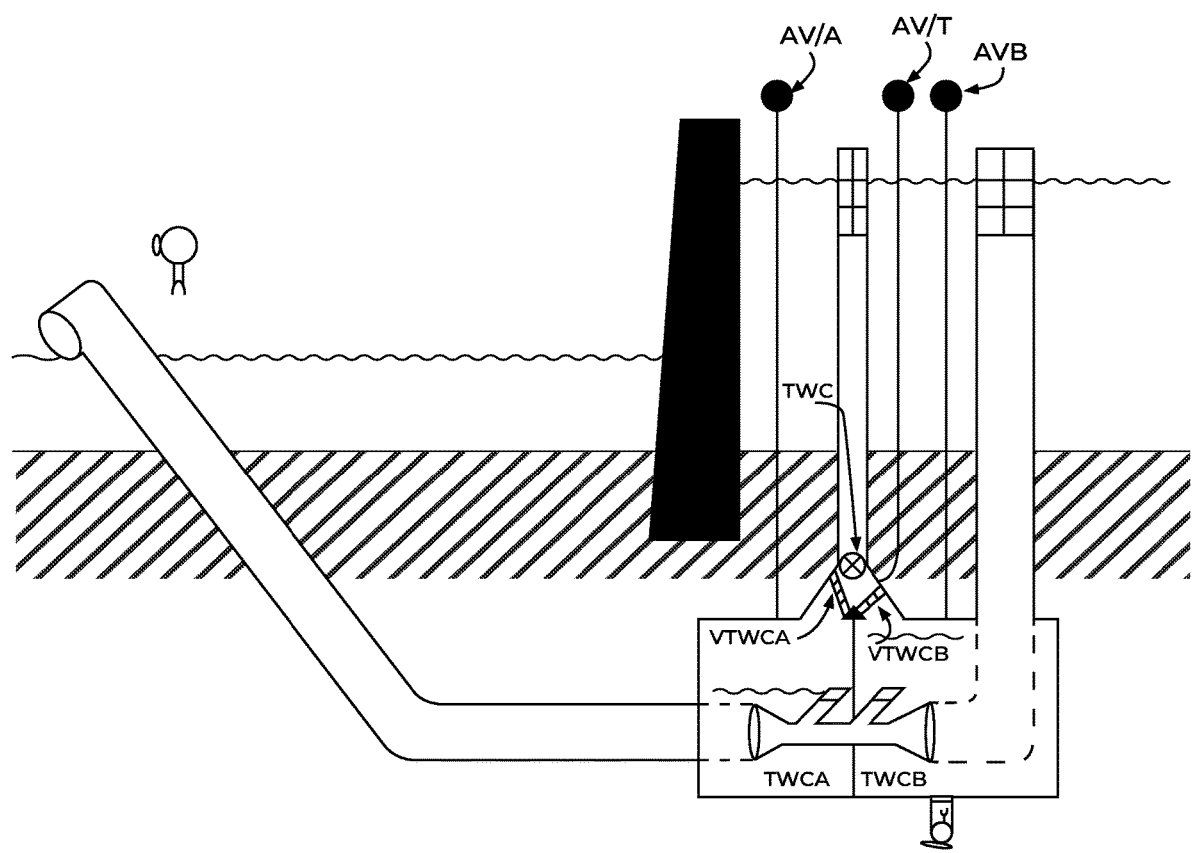
FIG. 10 is an elevation view of an eighth exemplary embodiment of the invented power generation system.

FIG. 10 depicts an embodiment that is a modified example for FIG. 9. The difference between FIGS. 10 and 9 is that the embodiment shown in FIG. 10 has added an air vent to both (TWCA) and to (TWCB). Thus, if you want to send water vented to atmosphere into the venturi from (TWCB), then air vent (AVB) is open. If you want to send water that is not vented to atmosphere from (TWCB) into the vacuum pump system, then air vent (AVB) is closed. The same relationship applies between (TWCA) and (AVA). In any event the (TWC) preferably is vented to atmosphere during normal operation via air vent (AV/T). Whether or not water from the turbine (TWCA) and (TWCB) is vented to atmosphere or not vented to atmosphere can be decided by an expert in the appropriate arts for particular applications.

Figure 11:
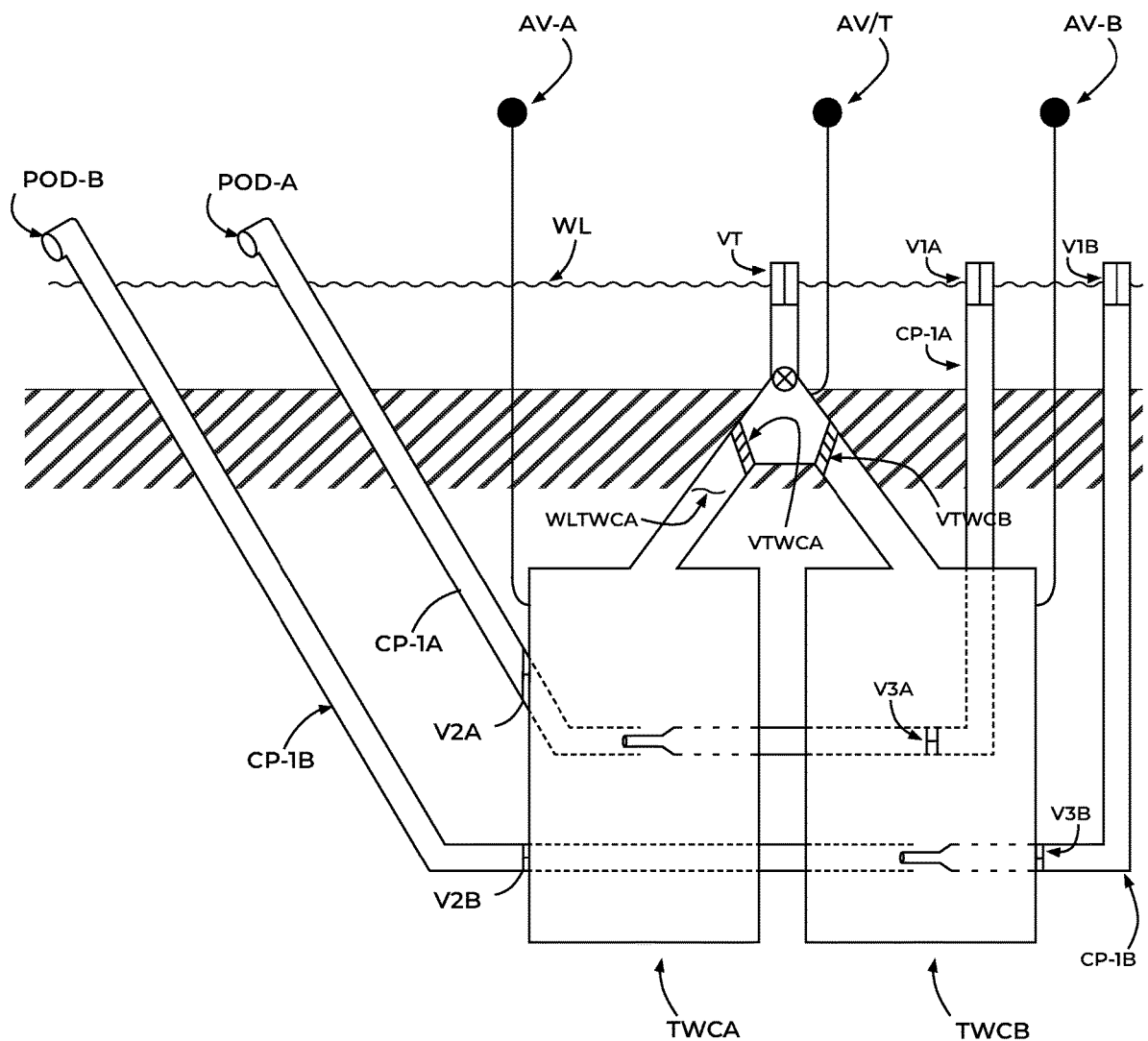
FIG. 11 is an elevation view of a ninth exemplary embodiment of the invented power generation system.

The exemplary embodiment shown in connection with FIG. 11 shows that two or more ejector Systems (EJ) can be employed in an application of the invention. This model has separate ejector systems (EJ) being supplied with water from the same penstock. The systems can be designed to alternate evacuating water or run concurrently. If they run concurrently then valves (WLTWCA) and (VTWCB) are left open and valves (V2A), (V3A), (V2B) and (V3B) are left open. Then the valves associated with chamber (TWCA) and (TWCB) can alternate opening and closing.

This example further shows that the penstock, the connecting pipes supplying water to the ejector vacuum pump systems (EJ) and the point of discharge can have the same head of water. Preferably, the water being supplied to valves (V1A and V1B) is moving (like but not limited to water from a river, stream or canal system). If desired or necessary, then a dam system or water tower system can be added to increase the head of water supplying water to (V1A) and (V1B). This would increase the pressure differential between the water entering through intake valves (V1A and V1B) and the points of discharge (POD-A and POD-B). The examples in FIGS. 1, 6 and 8 show variations between the water levels among the water entering connecting pipe (CP-1A) and the point of discharge (POD).

Figure 12:
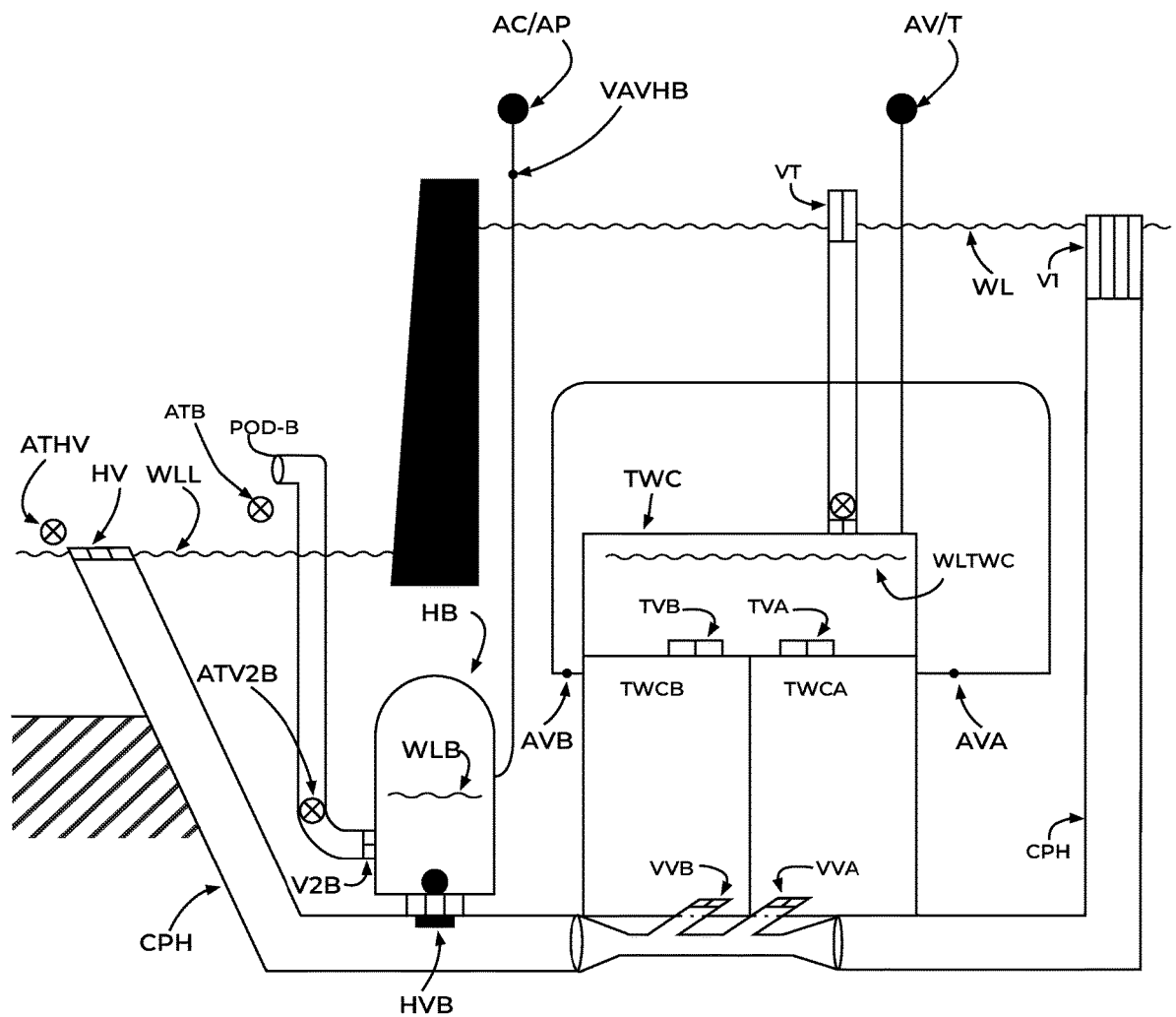
FIG. 12 is an elevation view of a tenth exemplary embodiment of the invented power generation system.

The exemplary embodiment shown in connection with FIG. 12 uses a Hammer Pump component. Hammer Pump (also known as Ram Pumps) variations can also be used to evacuate water from the invented system. Hammer pumps operate differently from venturi and ejector pumps (note that ejector pumps are also called "jet pumps"). FIG. 12 uses a Hammer Pump. Hammer pumps are also called (Ram pumps). This exemplary embodiment also has two evacuation chambers. They are (TWCB) and (TWCA). They can be filled at the same time, afterwards then be emptied at the same time. However, this example has the two evacuation chambers alternating being filled and evacuated. Thus as (TWCA) is being filled with water from the turbine water chamber (TWC) via valve (WA) the other (TWCB) is being evacuated of its water content via valve (VVB). Having two or more evacuation chambers alternating being filled and emptied allows for a continuous power generation.

Air compressor (AC) pumps air into the hammer bell (HB). After the desired amount of air is pumped into (HB) valve (VAVHB) is closed and the air compressor/air pump (AC/AP) is shut off. Valve (TVA) is opened to fill evacuation chamber (TWCA) with water from (TWC). Then it is closed. Preferably Valves (VT), (V1) and (V5) are open during normal plant operation. Valve (V5) is shown in FIG. 3. Air vent (AV/T) is open during normal plant operation.

High pressure water from water level (WL) enters connecting pipe (CHP) and travels through that connecting pipe to valve (HV). Valves (HV) and (HVB) can be pressure operated, mechanically operated using springs and/or weights or electronically opened and closed. This scenario has them being operated using electronics. Meters can determine when those valves open and close.

This scenario has (TWCA) being filled with water from (TWC) via open valve (WA) while (TWCB)'s water content is being evacuated into the venturi via open valve (VVB). High pressure water from the high head of water (WL) entering valve (V1) enters the venturi system and mixes with water from (TWCB) and continues up connecting pipe (CHP) to valve (HV) causing the "hammer effect". When the pressure is sufficient valve (HVB) opens allowing the high-pressure water to enter chamber (HB). The air in (HB) becomes pressurized as water from (CPH) enters (HB) and causes its water level (WLB) to rise. Valve (V2B) preferably remains open during normal plant operation but can be opened and closed as necessary. When the air pressure in (HB) is sufficient the water in (HB) travels up a connecting pipe and is discharged into the low head of water (WLL) at the point of discharge (POD-B). Valves (HVB), (VVB) and (WA) are closed after the desired amount of water has been evacuated and valve (HV) can be opened to reset the hammer effect. Then (HV) is closed.

Valves (TVB) and (VVA) are opened allowing chambers (TWCB) and (TWCA) to alternate duties. Now (TWCB) is being filled with water from (TWC) while water from (TWCA) is being evacuated via valve (VVA) into the venturi system.

This scenario only uses one chamber (TWCB) to operate the hammer effect. (TWCA) is not used in this example to demonstrate how a one chamber evacuation chamber like but not limited to (TWCB) can be used to evacuate water from the invented system using the "hammer effect". Valve (TVB) is left open and (VVB) is left open. High pressure water entering through valve (V1) enters the venturi and draws water out from (TWCB) via valve (VVB) on account of the venturi effect "vacuum". The mix of water from CHP and TWCB travels up (CHP) to (HV) creating the "hammer effect". When the pressure is sufficient valve (HVB) opens allowing the high-pressure water to enter chamber (HB). The air in (HB) becomes pressurized as water from (CPH) enters (HB) and causes its water level (WLB) to rise. Valve (V2B) preferably remains open during normal plant operation but can be opened and closed as necessary. When the air pressure in (HB) is sufficient the water in (HB) travels up a connecting pipe and is discharged into the low head of water (WLL) at the point of discharge (POD-B). Valve (HV) opens after the pressure drop in HB and (HVB) and (HV) are closed to reset the hammer.

Auxiliary turbines like but not limited to: (ATHV), (ATB) and (ATV2B) can be added for additional power generation, if desired. (ATHV) and (ATB) preferably are positioned so they do not interfere with the water being discharged from the system.

Figure 13:
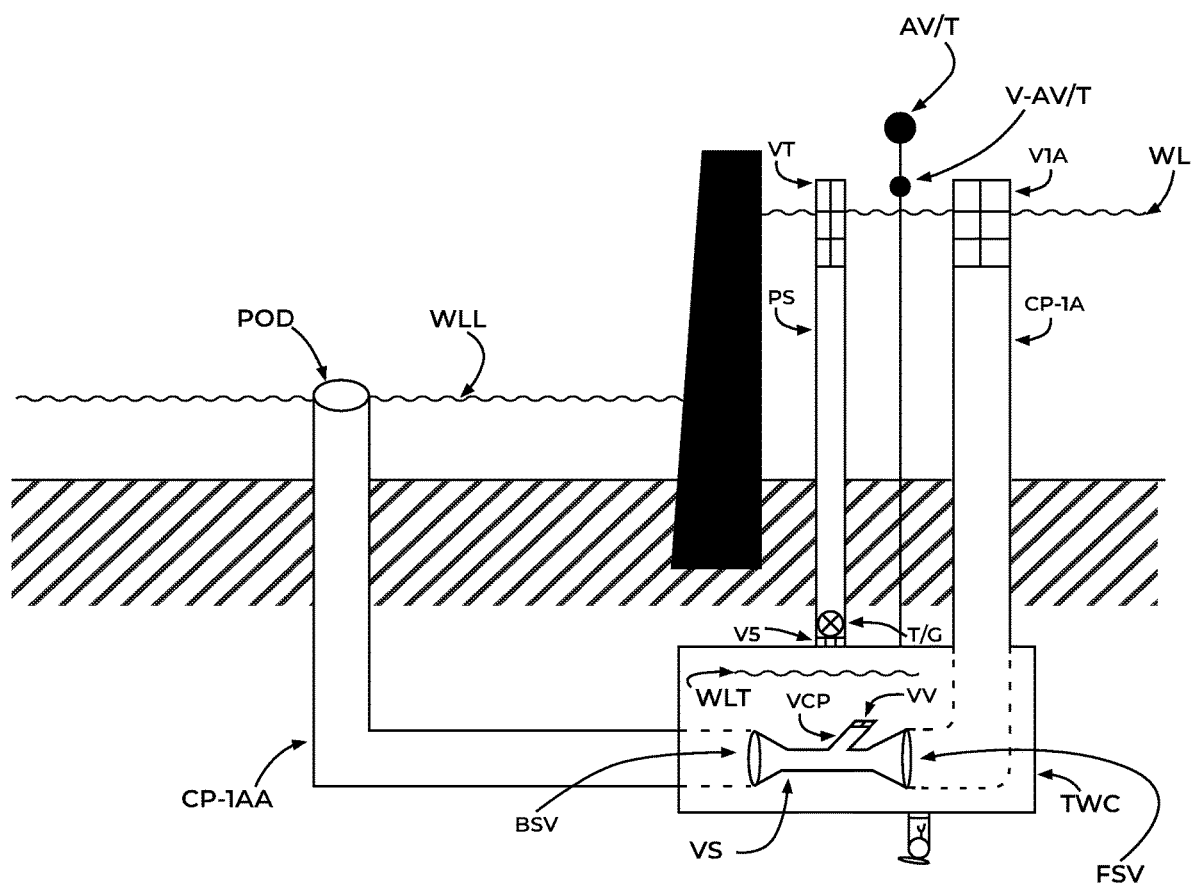
FIG. 13 is an elevation view of an eleventh exemplary embodiment of the invented power generation system.

With regard to the variability of various exemplary embodiments of the invention, turning to FIG. 13, the outlet or divergent cone of the venturi (BSV) is shown with a relatively smaller diameter with respect to other embodiments, and relative to the inlet or convergent cone of the venturi (FSV). This is provided as an illustrative example of the wide range of design choices that may be made in a given application and is not necessarily considered to be a preferred exemplary embodiment of a design. Those skilled in the art will appreciate that these components may be configured for a given application, flow rate, and pressure profiles of the environment to which the invention is being applied and is not considered to be particularly limiting with respect to the scope of the claimed invention. In this embodiment, the cone sizes and desired flow rates dictate a larger diameter for the connecting pipe inlet (CP-1A) than that of the discharge connecting pipe (CP-1AA), wherein the point of discharge (POD) is at or below the low water level head (WLL). This point can also be above this level, if desired.

Note that valve (V-AV/T) can be open to vent the turbine water chamber (TWC) to atmosphere. If (V-AV/T) is closed, then the turbine water chamber (TWC) is not vented to atmosphere. Valve (V-AV/T) can be opened and closed as necessary. The turbine water chamber (TWC) can have an air space between its water level (WLT) and valve (V5), or it/TWC can be filled with water and not have an air space.

The types of vacuum pump systems (such as but not limited to jet/ejector pumps, venturi systems, eductor systems, hammer pumps, double hammer pumps, and centrifugal pumps) that can be used in the disclosed systems are too numerous to list and their various designs for each type of pump system are too numerous to describe. The main purpose of the pumps is disclosed thoroughly herein, and it is expected that comparable replacements may be substituted by those skilled in the art without departing from the scope of the invention herein.

Also seen in FIG. 13 is the penstock (PS) positioned on the high head (WL) side of the dam. However, it can be placed on the low head (WLL) side of the dam if desired.

Figure 14:
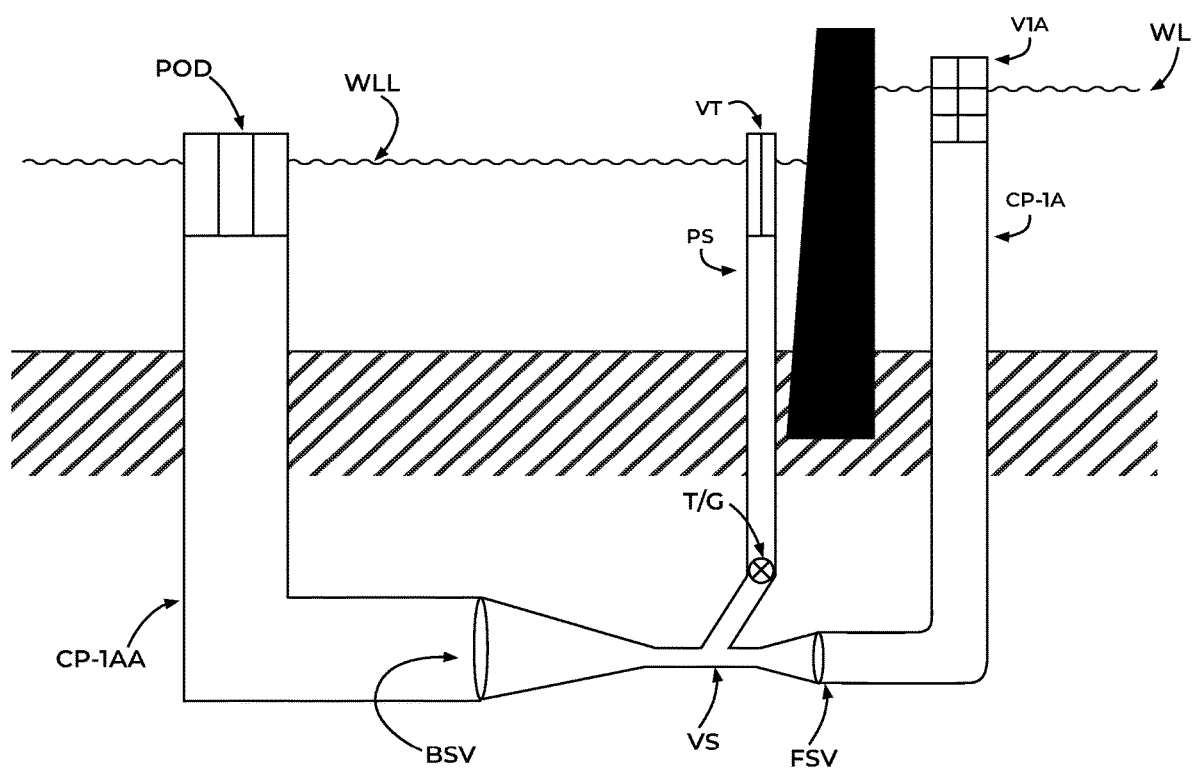
FIG. 14 is an elevation view of a twelfth exemplary embodiment of the invented power generation system.

In FIG. 14, an exemplary embodiment of the invention is shown wherein the penstock (PS) is connected directly to the venturi (VS) (i.e., there is no turbine water chamber (TWC) in this embodiment). This figure also illustrates a different design variation of a venturi for exemplary purposes. The diameter of the venturi system's (VS) inlet cone (FSV) is smaller than its outlet cone (BSV). Also, the outlet cone (BSV) is longer than the front inlet cone (FSV). The possible design variations for all the possible pumps that can be used such as but not limited to: venturi systems, jet pumps, hammer, double hammer pumps and centrifugal pumps are too numerous to describe. In the case of a venturi system, a typical configuration will see the inlet cone having a steeper cone angle than the outlet cone, but those skilled in the art will appreciate the selection will be based upon environmental and outcome-based design details for a given application.

Also illustrated in FIG. 14 is the different design of connecting pipe (CP-1AA). Its diameter is relatively larger than in other examples and bends upward at about a 90-degree angle. Its point of discharge is lower to maximize efficiency. However, its bend can be at various angles and the point of discharge (POD) can be positioned at various locations above the outlet cone (BSV), at or below the low water head (WLL).

Figure 15:
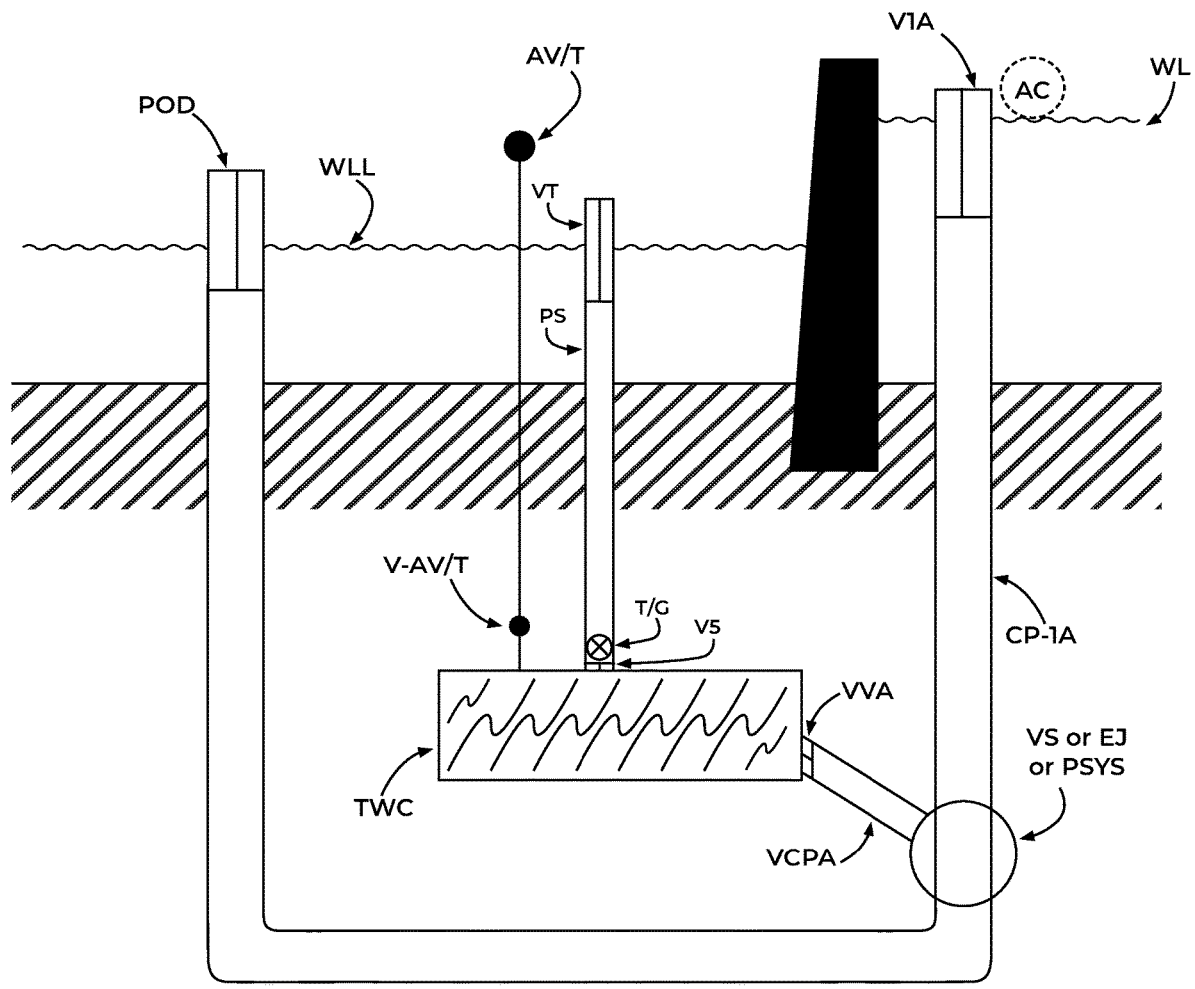
FIG. 15 is an elevation view of a thirteenth exemplary embodiment of the invented power generation system.

In FIG. 15, the turbine water chamber (TWC) is filled with a liquid or solution like but not limited to water. There is no air space in the (TWC) for this example. However, if desired an air space can be used, as depicted in other exemplary embodiments. Here, the turbine water chamber air vent valve (V-AV/T) can be opened or closed. This allows the turbine water chamber (TWC) to be open to atmosphere or closed to atmosphere as desired.

Also depicted in FIG. 15 is a modification of the design of connecting pipe (CP-1A) leading to the point of discharge (POD). This variation on the configuration is illustrative of the variety of spatial/dimensional characteristic options, wherein its bends can be at various angles/curves. Additionally, the point of discharge (POD) can be positioned at various locations above, at or below the low water head (WLL).

If desired, an air compressor (AC) can be added to force compressed (GAS) like but not limited to air down connecting pipe (CP-1A) to operate the venturi. Furthermore, any suitable pump system, like but not limited to: a venturi tube, a jet pump, a hammer pump, a double hammer pump and/or a centrifugal pump, can be used to move water through the system and to evacuate water from the system. This includes moving water that passed through turbine (TG) into connecting pipe (CP-1A) allowing it to be evacuated from the system at the point of discharge (POD) or reused.

Figure 16:
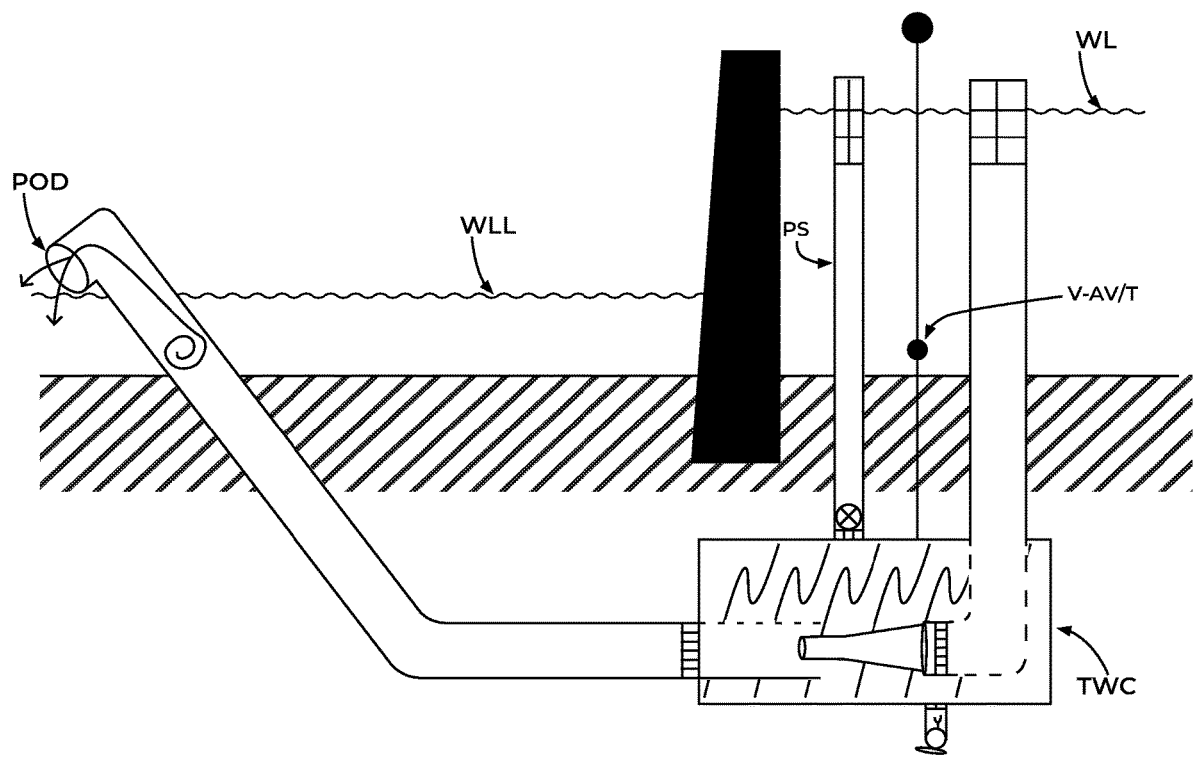
FIG. 16 is an elevation view of a fourteenth exemplary embodiment of the invented power generation system.

In the exemplary embodiment shown in connection with FIG. 16, the turbine water chamber (TWC) has no air space. The (TWC) is filled with a liquid/solution like but not limited to water. Air vent valve (V-AV/T) can be opened and closed as desired to vent the turbine water chamber (TWC) to atmosphere or to close it from atmosphere. If desired, an air space (not shown) may also be provided in the turbine water chamber (TWC). In this exemplary embodiment, the penstock (PS) is designed to be on the high head (WL) side of the dam but may alternatively be placed on the low head (WLL) side of the dam.

Figure 17:
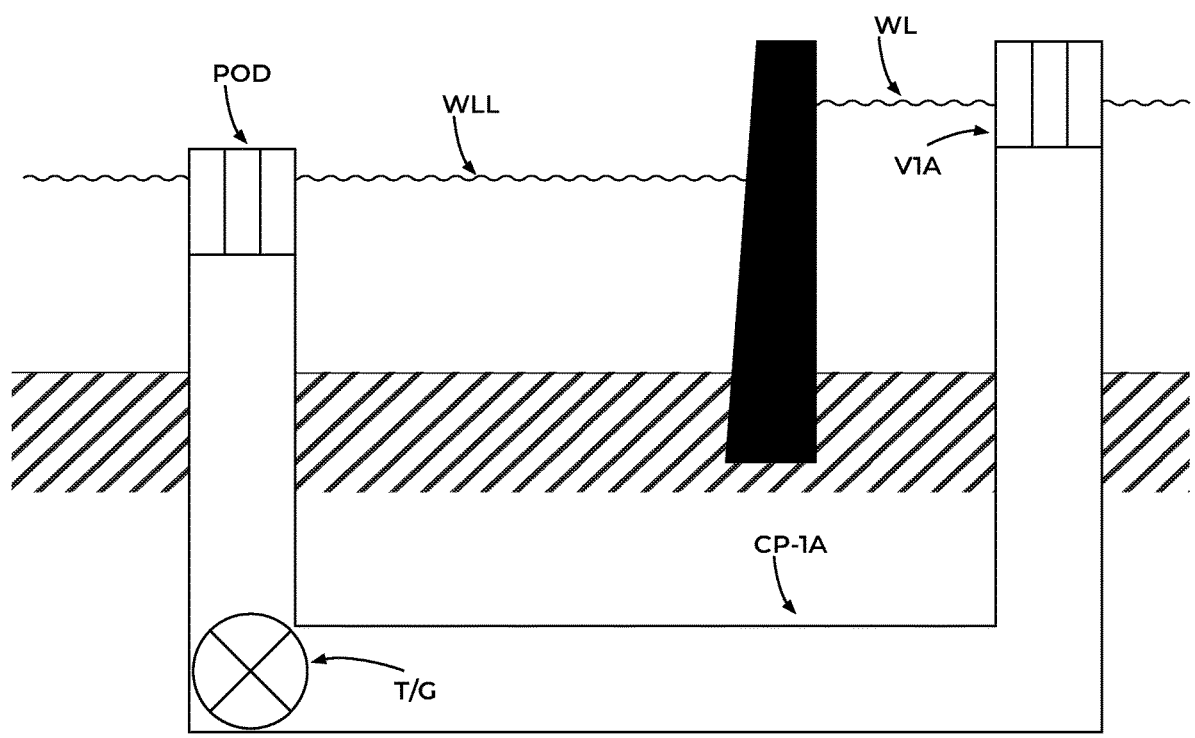
FIG. 17 is an elevation view of a fifteenth exemplary embodiment of the invented power generation system.

The exemplary embodiment shown in connection with FIG. 17 has a turbine/generator system (T/G) placed directly/indirectly in connecting pipe (CP-1A) to generate electricity.

Figure 18:
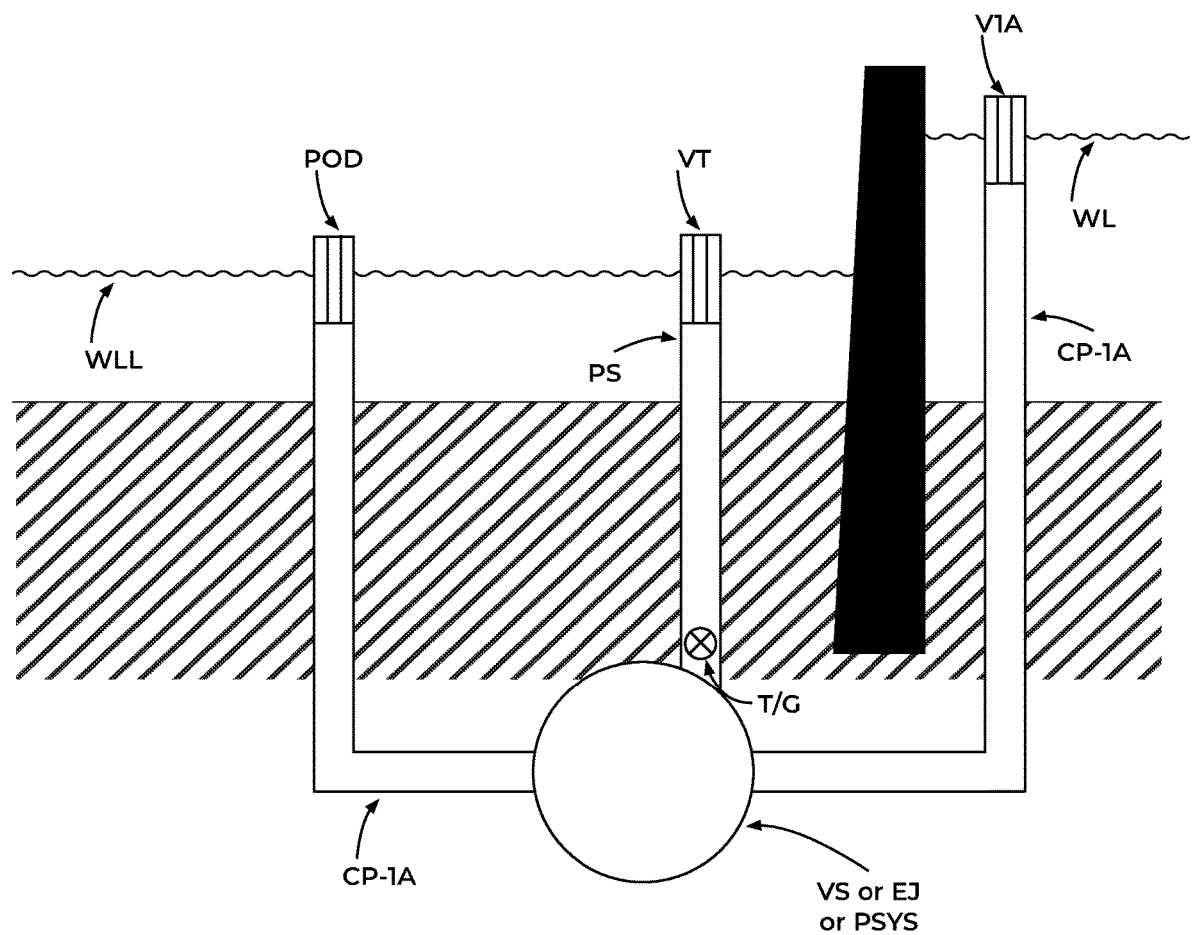
FIG. 18 is an elevation view of a sixteenth exemplary embodiment of the invented power generation system.

The exemplary embodiment shown in connection with FIG. 18 uses a general indicator (a circle) to represent all of the possible vacuum pump systems like but not limited to venturi systems, jet pumps (ejector pumps), hammer pumps, double hammer pumps and centrifugal pumps, that can be used to move water through the power plant and to evacuate water from the power plant. This includes moving water that passed through turbine/generator (TG) into connecting pipe (CP-1A) allowing it to be evacuated from the system at the point of discharge (POD) or reused. The indicia "P Sys" is also used to represent all of the various types of pump systems that will work with this system.

In this embodiment, the system has no turbine water chamber (TWC). The penstock feeds directly into the evacuation system (P Sys), which can have several different kinds of systems that will work such as but not limited to: a venturi, a jet pump/ejector system, a hammer pump, a double hammer pump and/or a centrifugal pump. The system that is ultimately employed in a given application will be calculated and tested by a skilled artisan in order to determine which type is best suited for the desired outcome.

Similarly, the design specifications of the penstock in characteristics such as diameter and length are too numerous to describe exhaustively herein but will be readily available in a particular application as applied by a skilled artisan. The invented Enhanced Hydroelectric Power Generator (EHPG) can be designed to have its penstock (PS) receive its supply of water from sources such as but not limited to: the low water head (WLL), the high-water head (WL), a water tower, and/or any other suitable source. Here, the penstock (PS) is shown drawing working fluid from the low water head (WLL).

Figure 19:
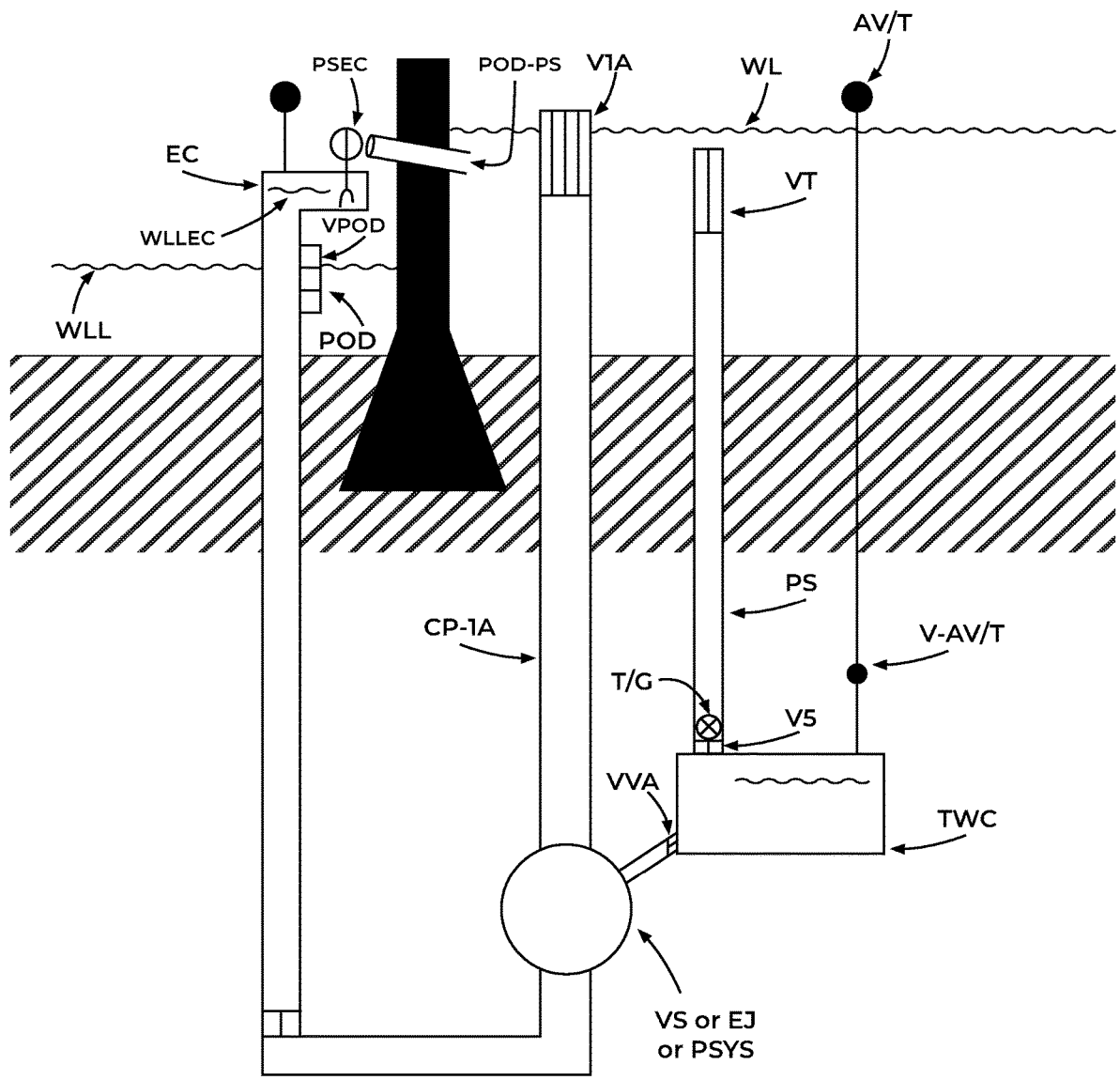
FIG. 19 is an elevation view of a seventeenth exemplary embodiment of the invented power generation system.

In the exemplary embodiment shown in connection with FIG. 19, the penstock (PS) receives its water from the high head (WL) side of the dam. Note that the Enhanced Hydroelectric Power Generator (EHPG) can be designed to have its penstock (PS) receive its supply of water from sources such as but not limited to: the low water head (WLL), the high-water head (WL), a water tower, and/or any other suitable source.

Figure 20:
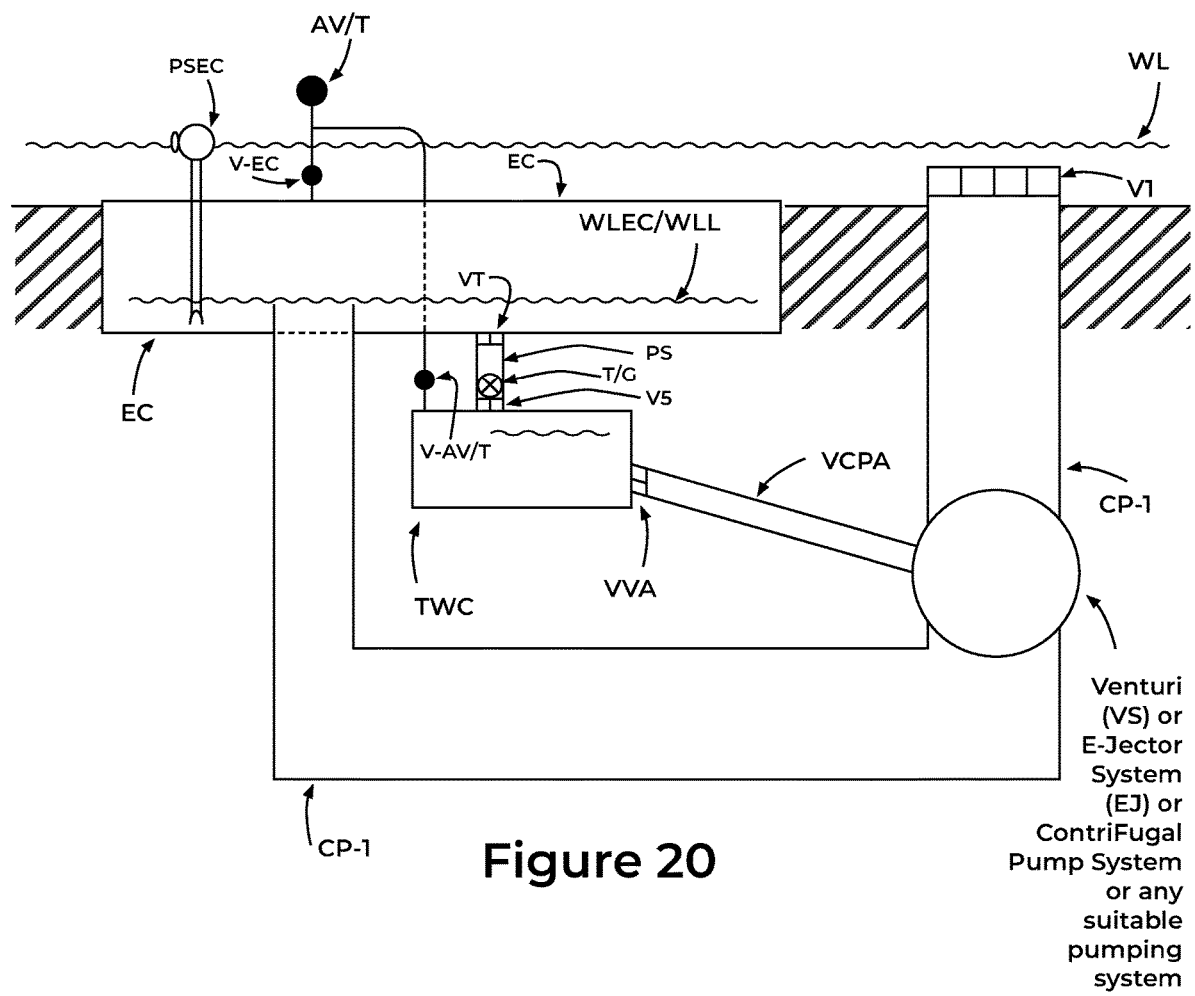
FIG. 20 is an elevation view of an eighteenth exemplary embodiment of the invented power generation system.

Turning to the exemplary embodiment shown in connection with FIG. 20, a system is depicted that receives its working fluid from a source without the use of a dam to create a differential in inlet and outlet head levels. The pressure differential comes from the distance between the high head of water from the source (WL) and the low head of water (WLEC) maintained in the evacuation chamber (EC). The low head of water (WLL) effectively becomes the water level in the evacuation chamber (WLEC). This configuration of this embodiment is suitable for installation and operation in locations like but not limited to: ponds, lakes, oceans, streams, rivers, tanks/reservoirs, land and any combination of land and water. It further permits for the penstock to be extended significantly longer than current designs allow.

Figure 21A:
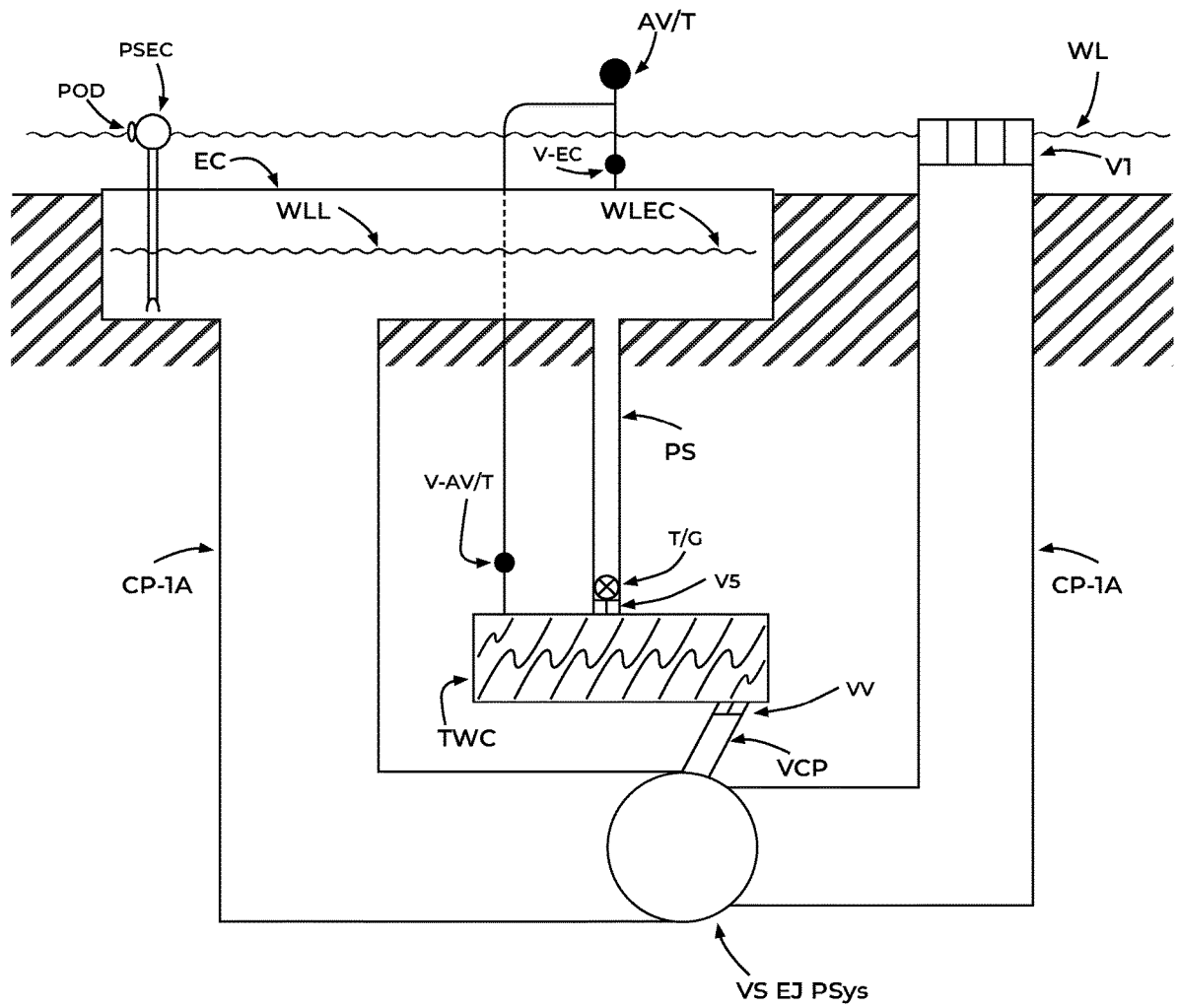
FIG. 21A is an elevation view of a nineteenth exemplary embodiment of the invented power generation system.
Figure 21B:
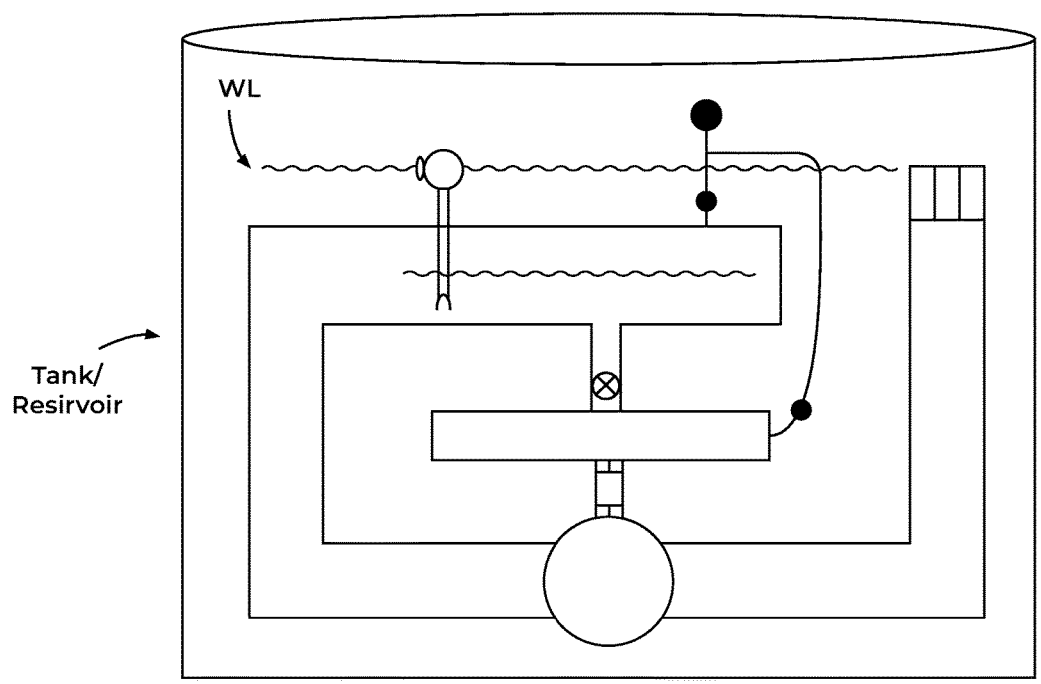
FIG. 21B is an elevation view of the embodiment shown in connection with FIG. 21A implemented in a tank/reservoir design.
Figure 21C:
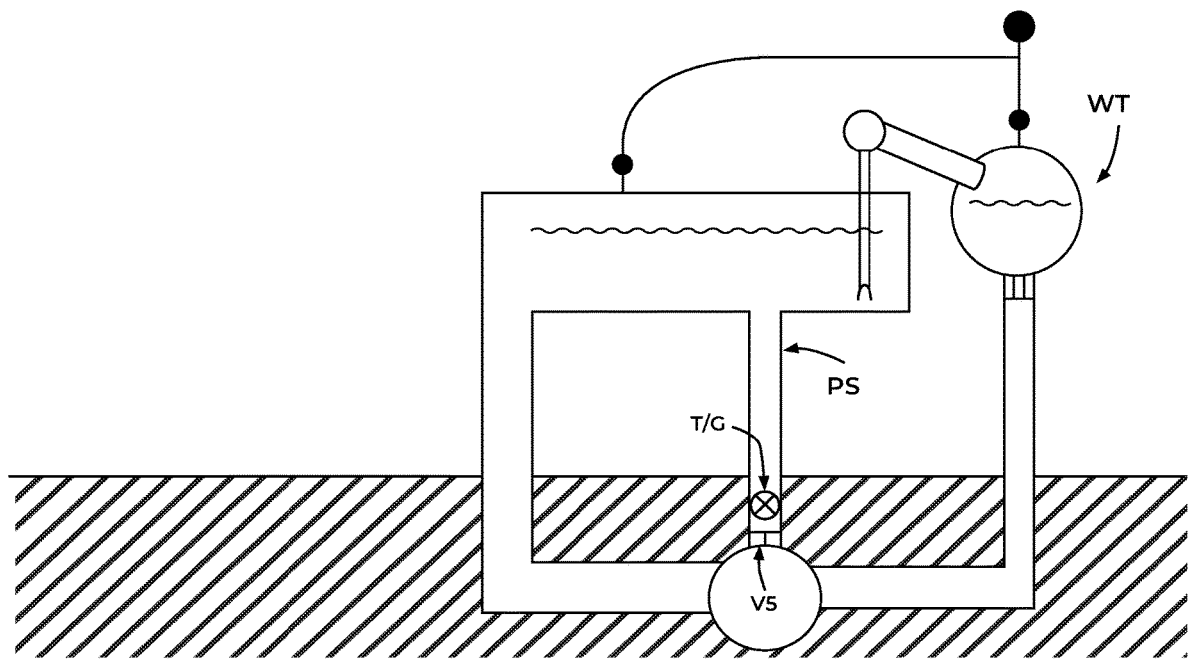
FIG. 21C is an elevation view of the embodiment shown in connection with FIG. 21A implemented in a water tower design.

Turning to FIGS. 21A-21C, a further exemplary embodiment is depicted wherein the system is installed in the absence of a dam, as in FIG. 20. In this exemplary embodiment, the penstock can be extended significantly longer than current designs allow. As seen in FIG. 21A, the turbine water chamber (TWC) has no air space and is completely filled with water. It is not vented to atmosphere. However, note that the turbine water chamber (TWC) can have an air space if desired. Air vent valve (V-AV/T) can be opened exposing the turbine water chamber (TWC) to atmosphere. If the air vent valve (V-AV/T) is closed, then the turbine water chamber (TWC) is not exposed to atmosphere.

As seen in FIG. 21B, the system may be installed and operated in this manner in connection with a tank/reservoir. In this exemplary, the turbine water chamber (TWC) is shown with an air space vented to atmosphere.

As illustrated in FIG. 21C, this type of embodiment may be deployed in a manner that utilizes a water tower (WT) to supply water to the system as a closed fluid loop, the water tower acting as a reservoir is described in previous work. This exemplary embodiment also shows the absence of a turbine water chamber, wherein the penstock (PS) runs directly into to a venturi system. This embodiment has terrestrial and extraterrestrial applications.

Figure 22:
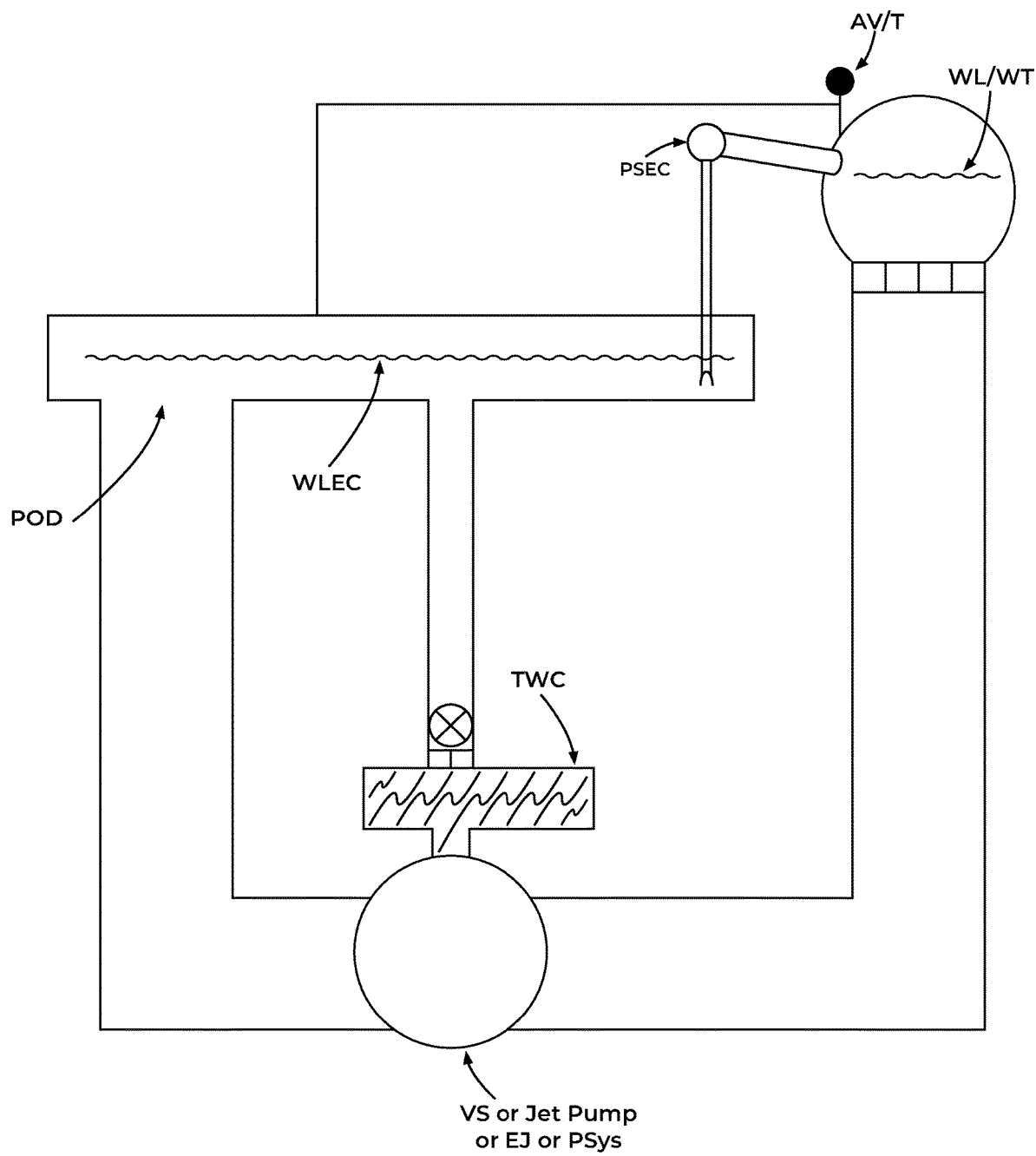
FIG. 22 is an elevation view of a twentieth exemplary embodiment of the invented power generation system.

FIG. 22 depicts an exemplary embodiment of the invention wherein the turbine water chamber (TWC) is filled with water and has no air space. The turbine water chamber (TWC) is not vented to atmosphere. Note that if desired, the turbine water chamber (TWC) can have an air vent system that can be opened to expose its turbine water chamber (TWC) to atmosphere. It can also be closed as necessary to prevent the turbine water chamber (TWC) from being exposed to atmosphere. This example can have an air space above the water level in the turbine water chamber (TWC), if desired.

Figure 23:
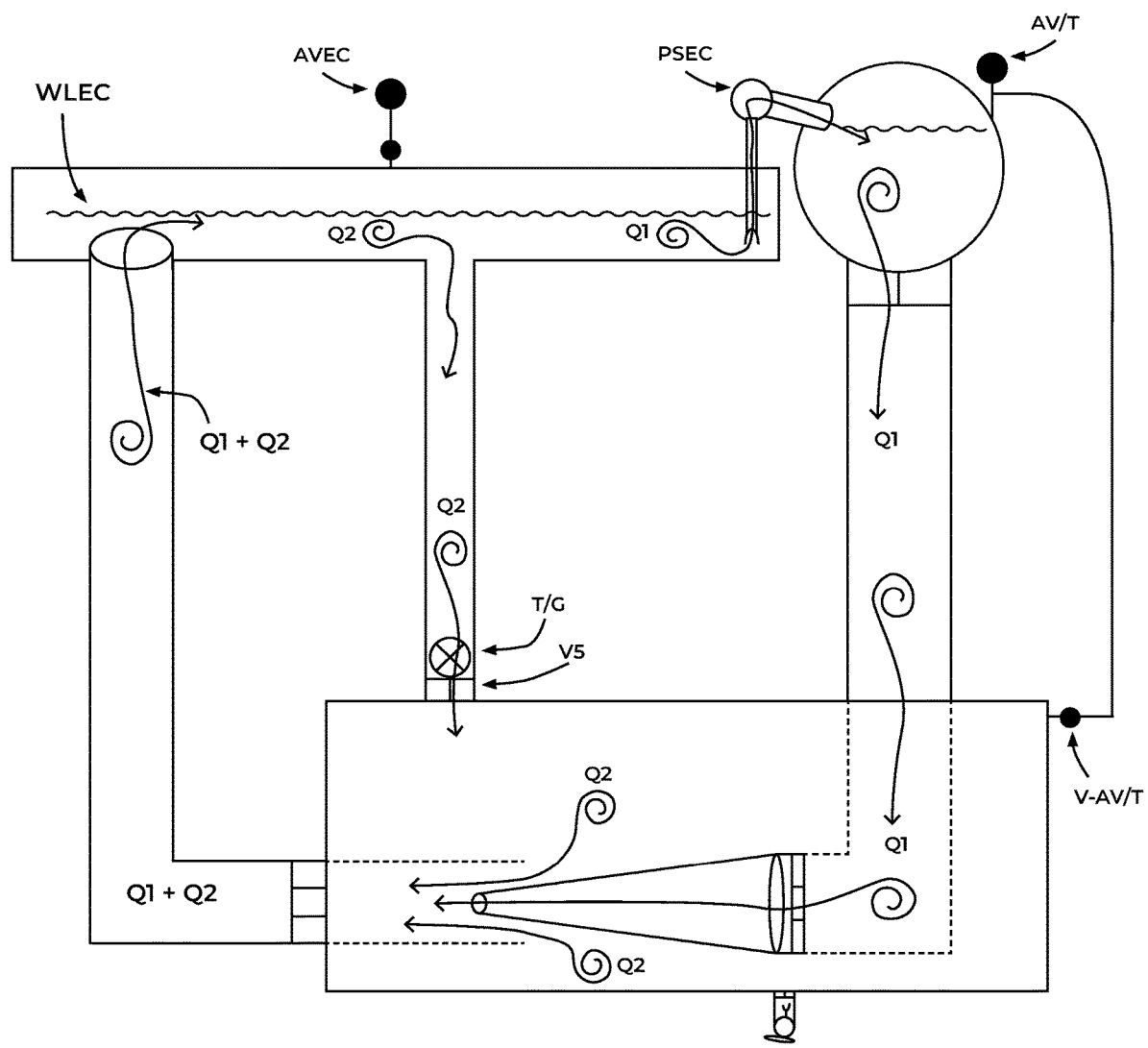
FIG. 23 is an elevation view of a twenty-first exemplary embodiment of the invented power generation system.

The exemplary embodiment depicted in connection with FIG. 23 shows a variation with a water tower providing the high head of water (WL) and the evacuation chamber (EC) providing the low head of water (WLEC). The turbine water chamber (TWC) has no air space and is filled with water. It is not vented to atmosphere in this embodiment. This illustration shows the flow of water through the system. If desired, the turbine water chamber (TWC) can have an air space above the water level inside of the turbine water chamber (TWC). The turbine water chamber (TWC) can be vented to atmosphere by opening valve (V-AV/T) and closing that valve closes the turbine water chamber (TWC) to atmosphere.

Figure 24A:
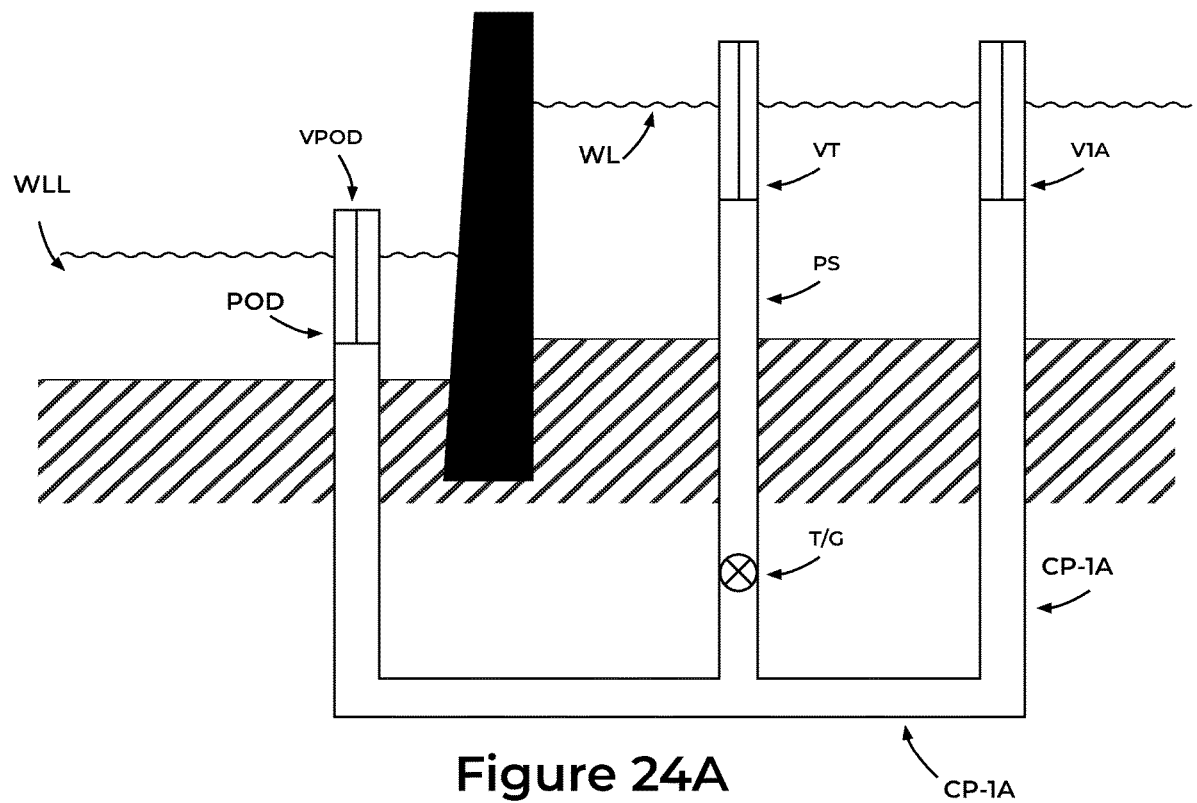
FIG. 24A is an elevation view of a twenty-second exemplary embodiment of the invented power generation system.

The exemplary embodiment shown in connection with FIG. 24A demonstrates that the penstock (PS) can feed directly into connecting pipe (CP-1A) without using a venturi or any other similar substitute system as described above. Note that the pressure of the water passing through the turbine system (T/G) in the penstock (PS) will drop in pressure. Consequently, the water entering connecting pipe (CP-1A) will have a lower water pressure then the water passing through (CP-1A). Additionally, the pressure differential between the high head of water (WL) and the low head of water (WLL) will help enable the water in (PS) to enter (CP-1A). This allows (CP-1A) to send water that entered it from intake valve (V1A) and water that entered it from the penstock (PS) out of the system at its point of discharge (POD).

Figure 24B:
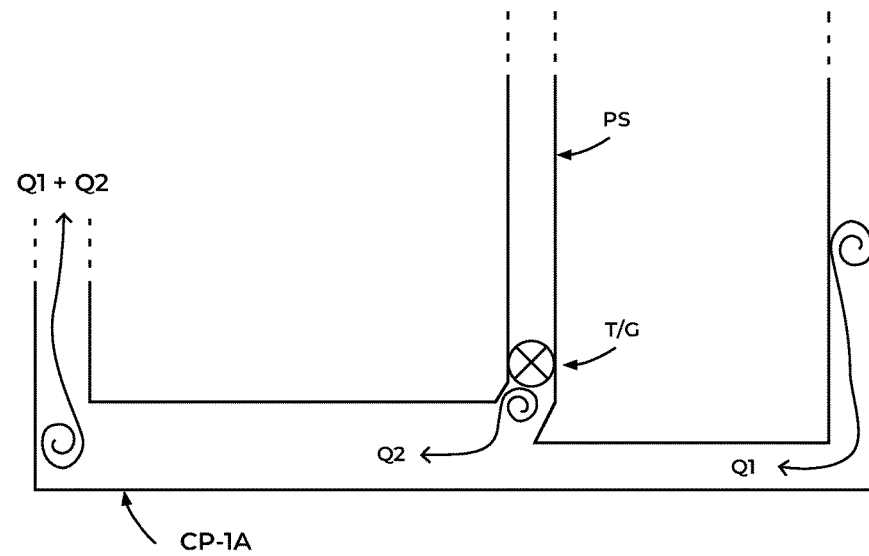
FIG. 24B is an elevation view of the embodiment shown in connection with FIG. 24A illustrating exemplary flow throughout the system.

FIG. 24B illustrates that the angle that the penstock (PS) connects to connecting pipe (CP-1A) can vary without limiting the claims of the presently disclosed invention. The inset also shows that the diameter of connecting pipe (CP-1A) can vary before it connects with the penstock and it can vary in diameter after the point at which it (CP-1A) connected with the penstock (PS).

Also, in this example, a valve (VPOD) at the point of discharge is shown that can be opened and closed as needed. The discharge valve (VPOD) can be operated/adjusted to control the flow of water exiting (CP-1A) into (WLL) and if desired and also to control the flow of water entering (CP-1A) from the low head of water (WLL). Preferably, valve (VPOD) is open when the (EHPG) is operating.

Figure 25A:
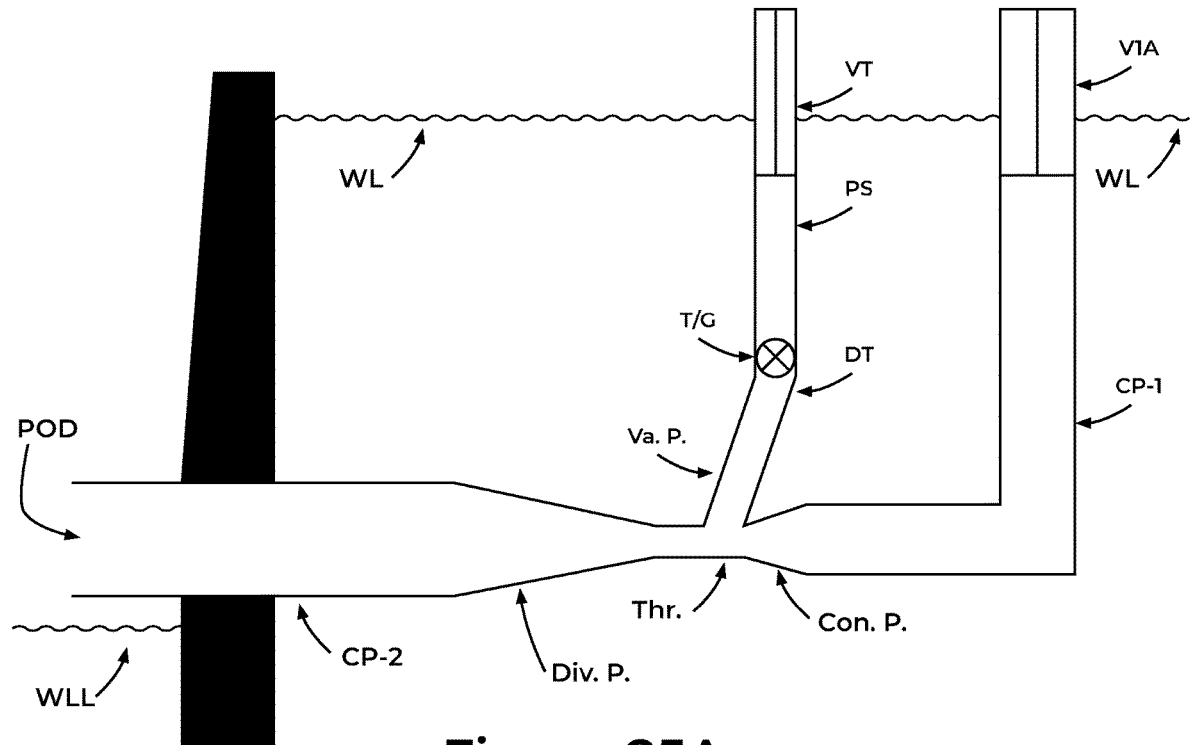
FIG. 25A is an elevation view of a twenty-third exemplary embodiment of the invented power generation system.

In the exemplary embodiment shown in connection with FIG. 25A, a system is shown with a venturi system in which there is a vacuum port (Va.P.), a draft tube (DT), a diverging part (Div.P.), a throat (Thr.), and a converging part (Con. P.).

The illustrated innovation helps (drop, move and/or pull) water through the turbine/generator system (T/G) because the "venturi effect" (vacuum) lowers the pressure of the water below the (T/G). This creates a pressure differential between the water below the (T/G) and the water above the (T/G). The water below the (T/G) is now at a low pressure and the water above the (T/G) is at a high pressure. This pressure differential allows water to pass through the (T/G) to generate electricity.

The pressure differential allowing water to move through the (T/G) is generated by the venturi effect. High pressure water with slower velocity enters through valve (V1A) and travels through connecting pipe (CP-1) to the venturi system (VS). The high-water pressure is reduced to a lower pressure as it moves through the front (converging part) of the venturi. The low velocity of that same flow of water is increased to a higher velocity. The high-pressure water with a low velocity that entered the venturi system now has a low pressure and a high velocity moving through the venturi system's throat. The throat of a venturi is the narrow pipe between its front converging part, where water enters it from (CP-1) and its back diverging part, is where water exits the venturi and enters connecting pipe (CP-2). Water passing through the venturi system initiates the venturi effect (a vacuum) that not only causes a pressure differential between the water below the (T/G) system and the water above it, but it also allows the low-pressure water, that passed through (T/G) to be (sucked/drawn/moved) into the venturi via a vacuum port leading into the throat of the venturi system. The vacuum port of a venturi is a pipe connection that receives the low-pressure water that passed through the (T/G) allowing it to enter into the venturi system's throat. Now the combined flow of water in (CP-2) is delivered to the point of discharge where it is evacuated from the power plant. The low-pressure water is raised to a higher pressure as it travels through the back (diverging part) of the venturi. Likewise, the high velocity water is lowered to a low velocity flow as it travels through the back (diverging part) of the venturi. The combined flow of water that passed through the venturi now has a water pressure approximately equal to the water pressure that entered it. Likewise, the velocity of the combined flow of water exiting the venturi now has the same approximate velocity as the water that entered it (the venturi). The water pressure in the connecting pipe system is now able to move (lift it if required) the combined flow of water out of the point of discharge where it exits the power plant.

This model has the penstock's draft tube (DT) connected directly to the venturi system's vacuum port (VaP). The draft tube is the pipe connection that receives water being discharged from the turbine/generator system (T/G). It may be possible to connect the (T/G) directly to the venturi system's (vacuum port) that extends from the throat of the venturi. Here, the vacuum port would also be the draft tube.

The order of opening valve (V1A) which provides the flow from the high head (WL) of water into connecting pipe (CP-1) and valve (VT) which provides the flow of water that passes through the turbine generator system (T/G) can vary. They can occur simultaneously, valve (V1A) can be opened first or valve (VT) can be opened first. The best order for opening these valves needs to be calculated and tested by an expert in the appropriate arts. It is probably best to open valve (V1A) to initiate the vacuum effect and then open valve (VT). However, they can be opened as desired and/or necessary. Preferably, the penstock and draft tube are filled with water as is the connecting pipe system. However, the set up for the power plant needs to be calculated and tested by an expert in the appropriate arts for particular applications.

The high-pressure water entering the venturi from connecting pipe (CP-1) is reduced to a lower pressure as it moves through the front of the venturi and into the venturi system's throat; and its low velocity is increased to a higher velocity as it travels through the front of the venturi and into the throat of the venturi. Then as that water exits the venturi system's throat it begins to revert back to a high-pressure water flow with a low velocity. The "venturi effect" (vacuum) lowers the pressure of the water behind the (T/G) located in the draft tube which establishes a pressure differential. Accordingly, the water below the (T/G) is now at a lower pressure then the water above the (T/G). This pressure differential enables the high-pressure water above the (T/G) to move through it to generate electricity. Water passing through the (T/G) loses pressure operating the (T/G) system, as well. The "venturi effect" (vacuum) sucks/draws low pressure water from the draft tube and into the venturi via its vacuum port. Again, the combined flow of water entering the venturi system from the venturi system's vacuum port and from connecting pipe (CP-1) has its water pressure increased and its velocity decreased as it continues to move through the venturi system. Upon entering connecting pipe (CP-2) the pressure of the flow of water exiting the venturi should be approximately equal to the high pressure of the water that entered it from connecting pipe (CP-1). Likewise, the velocity of the water exiting the venturi system should be elevated to approximately the same low velocity of the water that entered it from connecting pipe (CP-1). This high-pressure water can now move the water to the point of discharge where it is evacuated from the power plant.

Jet pumps—or ejector systems—operate under the similar modes of operation as the venturi systems. Jet pumps use a nozzle effect to lower the pressure behind the (T/G) to generate a pressure differential. The pressure differential allows the high-pressure water in front of the (T/G) system to pass through it and generate electricity. The jet pump's (ejector system's) nozzle effect also draws the low-pressure water that passed through the (T/G) system into the jet pump. There is a similar effect from using a jet pump compared to a venturi system. Water entering the jet pump from connecting pipe (CP-1) has its pressure reduced and its velocity increased. The "nozzle effect" replaces the venturi effect. Water that passed through the (T/G) is drawn into the jet pump via an opening because of the "nozzle effect". The combined flow of water that entered the jet pump has its pressure increased and its velocity decreased. Its pressure becomes equal to or nearly equal to the high pressure of the water that entered the jet pump from connecting pipe (CP-1). Likewise, the velocity of the water exiting the venturi and entering (CP-2) has its velocity lowered to a point equal to or nearly equal to the velocity of the water that entered the jet pump from (CP-1).

Figure 25B:
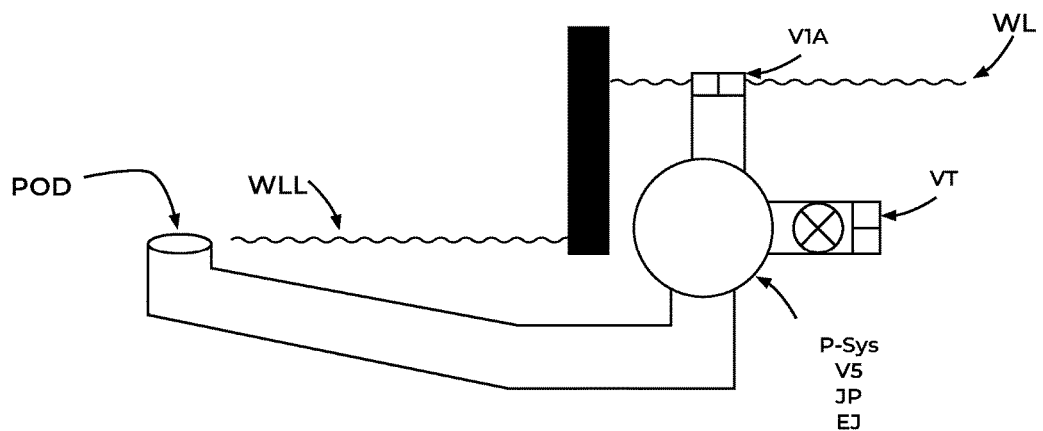
FIG. 25B is an elevation view of a variation on system elements shown in connection with the embodiment of FIG. 25A.

FIG. 25B demonstrates different positions/locations of venturi systems, jet pump, ejector systems and any other appropriate systems (P Sys) capable of evacuating water after passing through the (T/G), especially ejector and dual hammer pumps.

Figure 26:
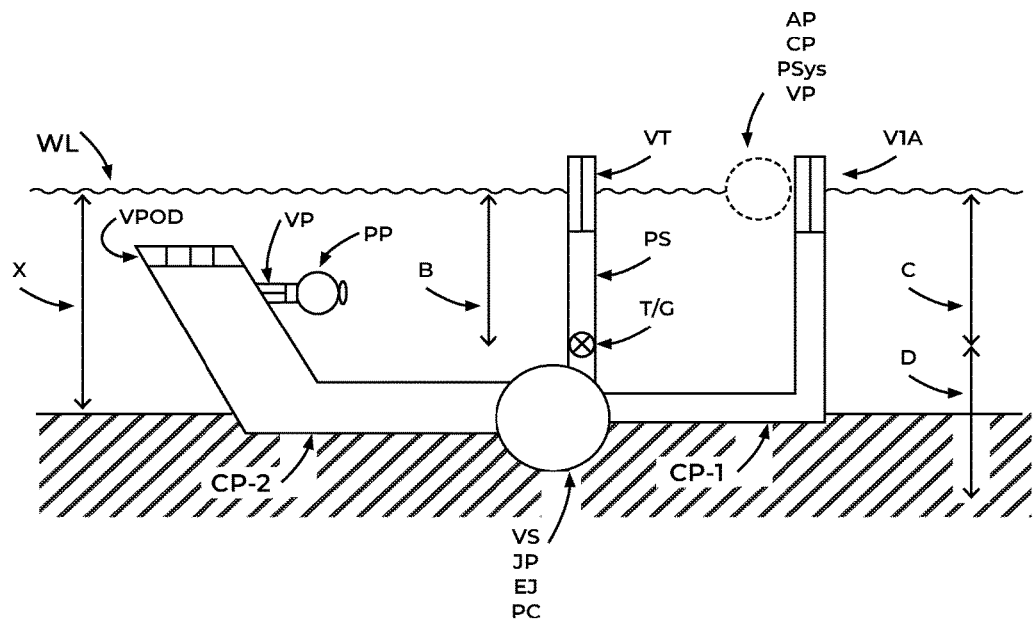
FIG. 26 is an elevation view of a twenty-fourth exemplary embodiment of the invented power generation system.

Turning to FIG. 26, an exemplary embodiment is depicted similar in operation to that shown in connection with FIG. 21, which uses an evacuation chamber to enhance the pressure differential generated by a venturi system. This embodiment does not use a dam or an evacuation chamber as a source of pressure differential. The pressure differential required to operate the power plant is supplied primarily by the venturi system (VS) or any other appropriate system such as but not limited to a jet pump/ejector system, eductor system, hammer system, dual hammer system, centrifugal pump system or any combination of the aforementioned systems or comparable substitutes now known or later developed. The pressure differential is also regulated by the flow of water through connecting pipes (CP-1) and (CP-2). Additionally, water passing through the turbine/generator (T/G) system also has its pressure lowered.

This variation demonstrates that the venturi system (VS) or any other appropriate system (and any comparable component (P Sys) as mentioned above) is used to lower the pressure of the water in connecting pipe (CP-1). Accordingly, the combination of the venturi effect (or, e.g., the nozzle effect if a jet pump/ejector system is used) and the force of the water traveling through (CP-1) helps generate a pressure differential enabling the (T/G) to operate (generate power).

Water passing through the turbine/generator system (T/G) has its pressure reduced after operating (T/G). This allows the low-pressure water to enter the venturi (or any other appropriate system like but not limited to a (jet pump/ejector system). The high-pressure water in (CP-1) enters (VS) or any other appropriate system as previously stated. It has a relatively low velocity. However, after entering (VS)/(JP)/(PS) its pressure is reduced, and its velocity is increased. This allows the venturi (VS) or any other appropriate system as previously mentioned to draw the low-pressure water (entrained fluid) that passed through (T/G) into the venturi (VS) or any other appropriate system as previously mentioned. Here, the water that passed through (T/G) and the water from (CP-1) comingle. The velocity of the combined flow of water is reduced and its pressure increases as it travels through (VS) or any other appropriate system as previously mentioned. After exiting (VS) or any other appropriate system as previously mentioned, the velocity of the combined flow becomes equal to or nearly equal to the velocity of the flow of water from (CP-1) that entered (VS) or any other appropriate system as previously mentioned. Likewise, after exiting the venturi (VS) or any other appropriate system as previously mentioned, the pressure of the combined flow becomes equal to or nearly equal to the pressure of the flow of water from (CP-1) that entered (VS) or any other appropriate system as previously mentioned.

The combined flow of water travels through connecting pipe (CP-2) and exits the system through valve (V-POD). Valve (V-POD) can be opened and closed as necessary.

It may be necessary to prime (VS) or any other appropriate system as previously mentioned for it to operate in certain applications. To prime (VS) or any other appropriate system as previously mentioned, valve (V-POD) is closed and valves (VP), (V1-A) and (VT) are opened. Prime Pump System (PP) pumps water out from connecting pipe (CP-2). When (VS) begins operation valve (V-POD) is opened and pump system (PP) is shut off. Valve (VP) is closed. Valves (V-POD) and (VP) can be opened and closed as needed. Pump System (PP) can be used as desired.

(X) represents the depth of the water. This depth can vary. (B) and (C) represent the length of the penstock up to turbine/generator system (T/G). (D) represents the theoretical advantage of using the (VS) or any other appropriate system as previously mentioned. This advantage allows an increase in power generation than what can be expected from traditional hydroelectric power generation systems. The increase in the power generation is dependent upon many elements such as but not limited to the following: the size and specifications of the connecting pipes, the size and the specifications of the (T/G) system, the size and specification of the penstock (PS), the type and specifications of the system used to evacuate water that passed through (T/G) from the power plant, the specifications of pump system (PP), the flow of water through the system and the desired amount of power generation given the available amount of water.

This concept can be used for any desired amount of power generation given the appropriate supply of water (low head, moderate head and high heads of water). As in other variations, this embodiment can be operated in places such as but not limited to the following: ponds, creeks, streams, rivers, lakes and oceans.

Figure 27:
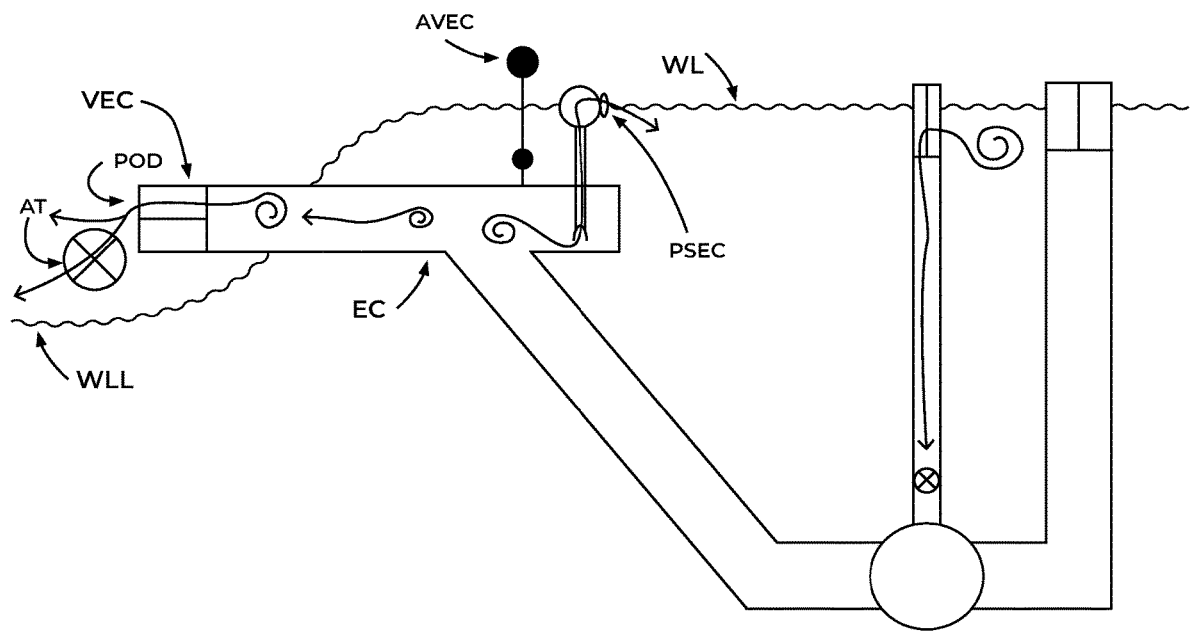
FIG. 27 is an elevation view of a twenty-fifth exemplary embodiment of the invented power generation system.

The exemplary embodiment shown in connection with FIG. 27 illustrates a variation of FIG. 26. Here, an evacuation chamber (EC) is added to help establish a pressure differential to move water through the system. Water is sent to (EC) after passing through the venturi or any other appropriate vacuum pump system as previously mentioned. Then pump system (PSEC) evacuates the water from the power plant. A valve controlling air vent (AVEC) determines whether (EC) is open or closed to atmosphere. Evacuation chamber (EC) can be open or closed to atmosphere as desired for a given application.

As desired/necessary for a given application, the evacuation chamber (EC) can extend/travel any desired distance in order to drain its water content into a lower head of water. This method would replace having to pump the water from the evacuation chamber (EC). An optional auxiliary turbine (AT) can be placed at the (POD) to generate additional electricity if desired.

Figure 28:
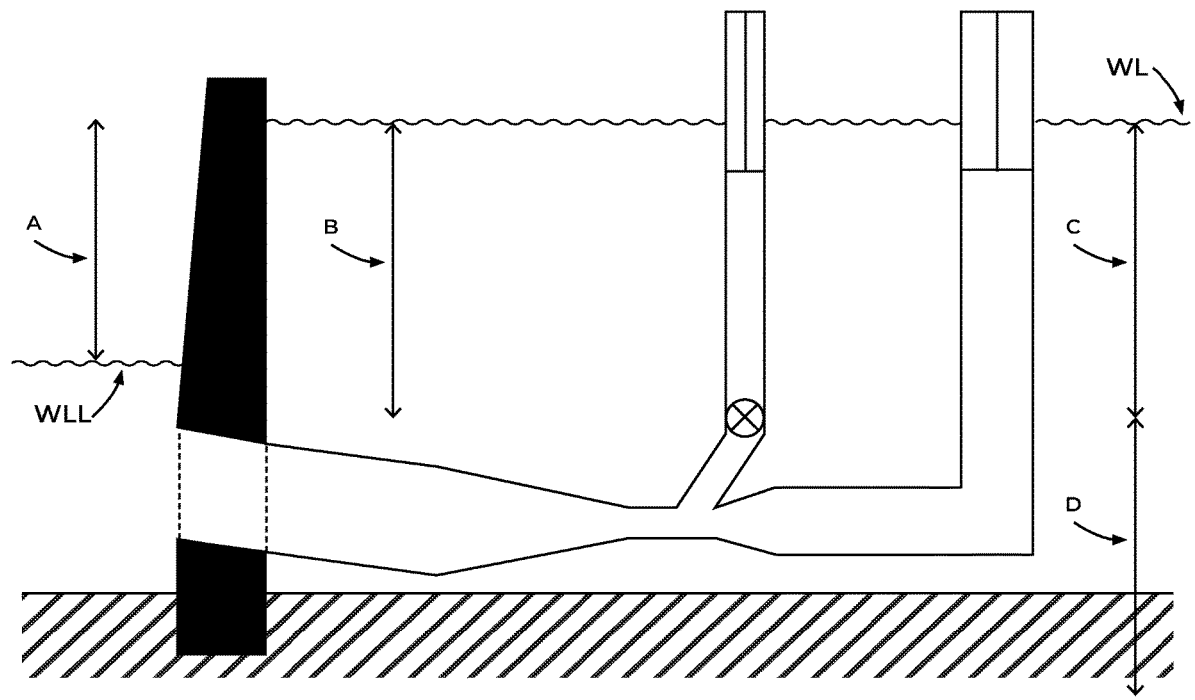
FIG. 28 is an elevation view of a twenty-sixth exemplary embodiment of the invented power generation system.

The exemplary embodiment depicted in connection with FIG. 28 illustrates the concept involving systems like but not limited to (venturi systems, jet pump systems, ejector systems, double hammer systems, (P Sys), etc.) can be applied to any of the following: low head dams, moderate head dams and high head dams to increase the power generation and/or efficiency over traditional hydroelectric power plants.

Figure 29:
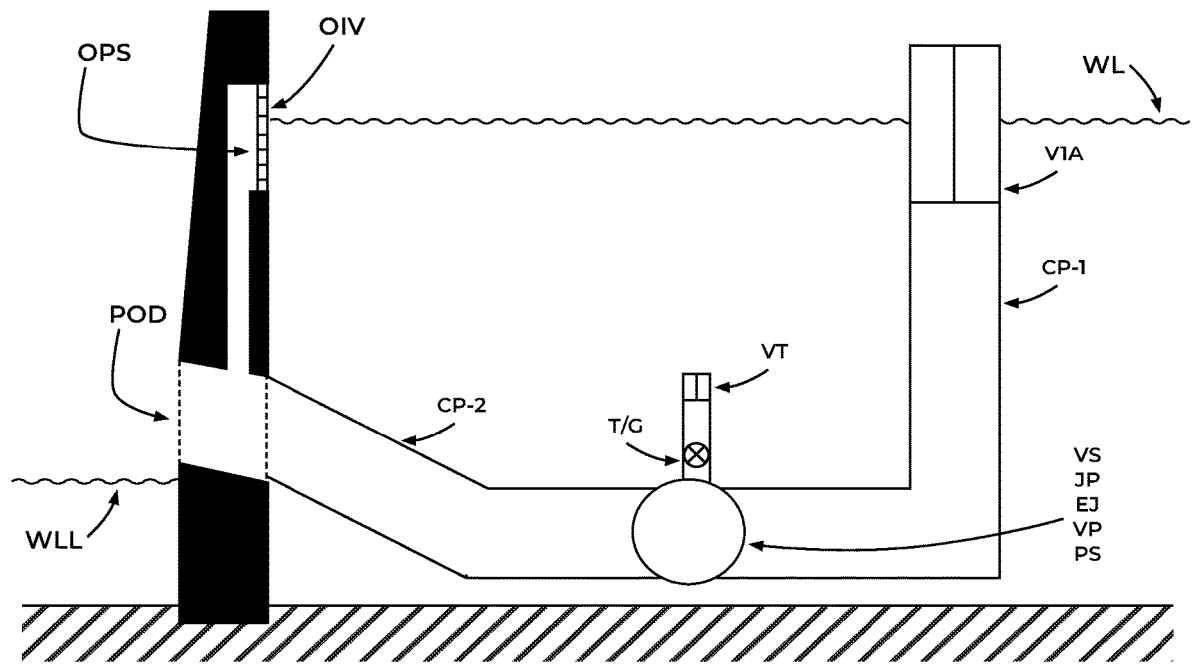
FIG. 29 is an elevation view of a twenty-seventh exemplary embodiment of the invented power generation system.

This embodiment demonstrates that it can be added to existing hydroelectric power generating systems or replace them if desired. It can also be a new construction, too. The exemplary embodiment shown in connection with FIG. 29 also shows another variation of how these types of hydroelectric power generating systems can be used to modify/upgrade existing hydroelectric power plants to make them generate more power and/or become more efficient. The embodiment in FIG. 29 shows one of several methods that this concept can be added to an existing hydroelectric power plant to improve its power generation and/or efficiency.

(OIV) is the old intake valve for the old power plants penstock. (OPS) is the old penstock of the old power plant. This variation shows that the old power plant's dam is being reused. It also shows that parts of the penstock and the point of discharge of the old power plant can be used. The possible variations for modifying an older hydroelectric power plant with the new concept are too numerous to describe exhaustively herein, but these embodiments illustrate exemplary retrofit scenarios and their application in other comparable scenarios will be readily apparent to those skilled in the art when combined with the disclosure provided herein.

Figure 30:
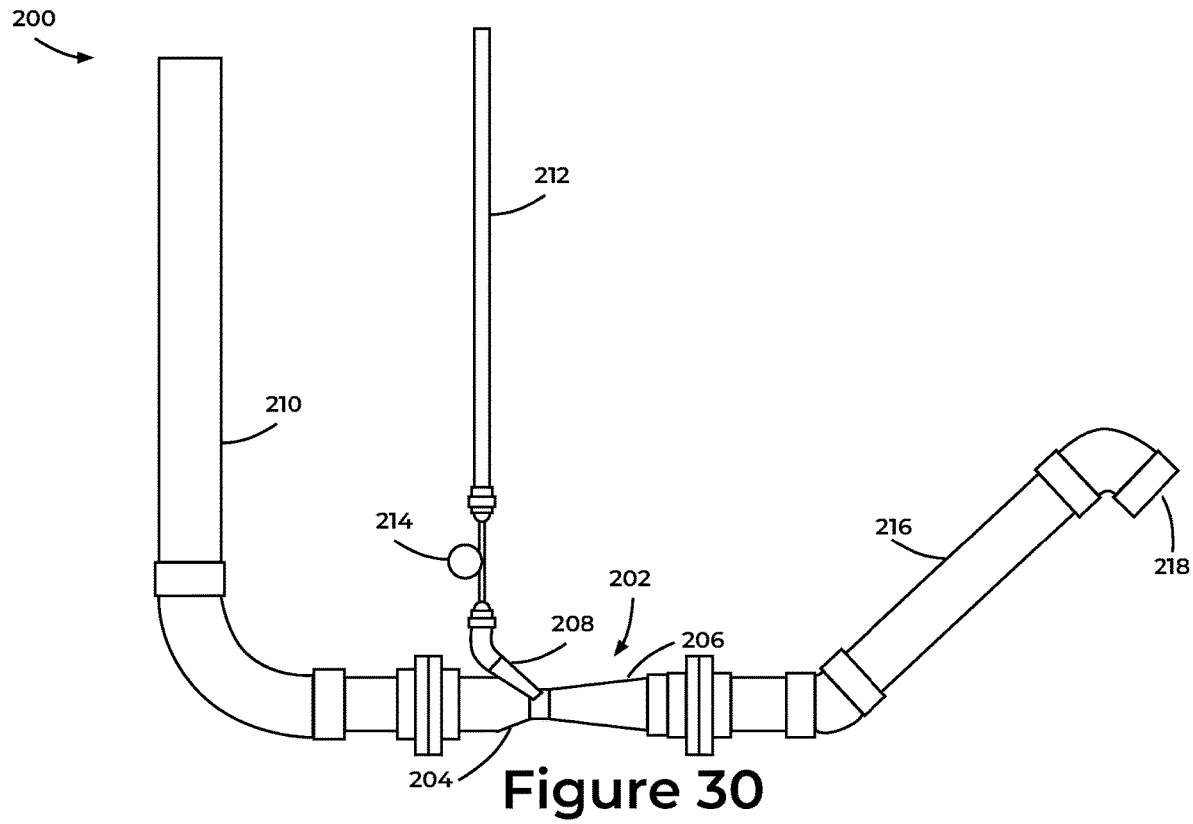
FIG. 30 is an elevation view of a twenty-eighth exemplary embodiment of the invented power generation system.
Figure 31:
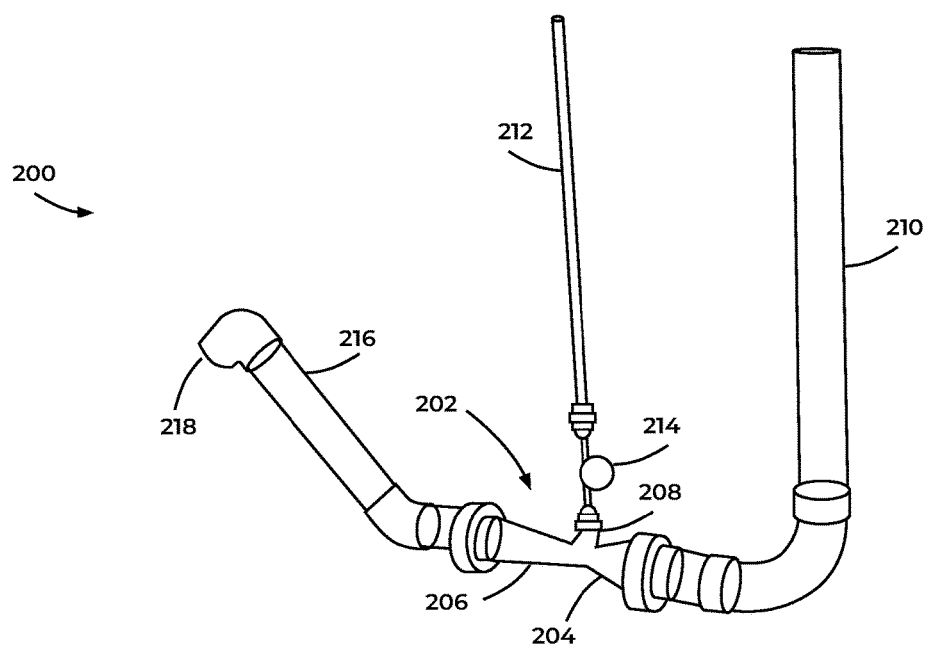
FIG. 31 is a perspective view of the exemplary embodiment of the invented power generation system shown in connection with FIG. 30.

FIG. 30 and FIG. 31 are elevation and perspective views, respectively, of a prototype model 200 created to demonstrate the principles of the invention as set forth above. As configured, this embodiment employs a venturi system 202 having an inlet or convergent cone 204, outlet or divergent cone 206 and a low-pressure or vacuum inlet 208. The high head of water enters the system via a first connecting pipe 210 and enters the inlet cone 204. At the restriction, the low-pressure inlet 208 receives fluid from the penstock 212 after passing through a turbine or turbine generator 214. The outlet cone 206 receives the mixture of these two flows and passes the same to the second connecting pipe 216 to the point of discharge 218.

Figure 32:
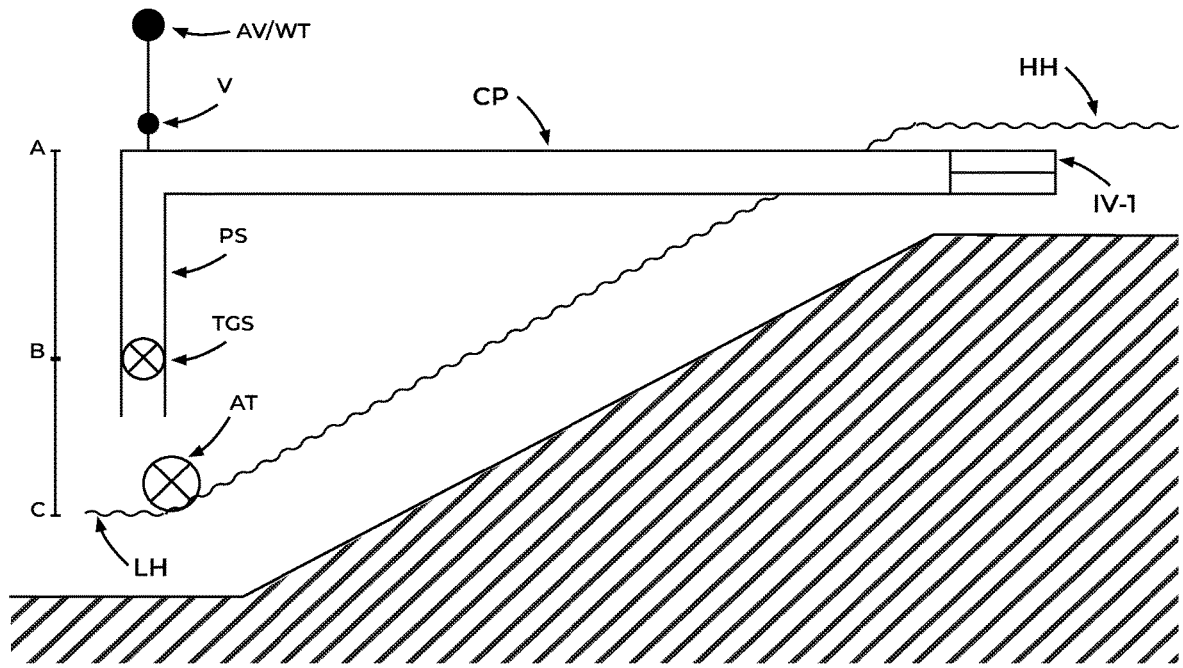
FIG. 32 is an elevation view of a twenty-ninth exemplary embodiment of the invented power generation system.

FIG. 32 shows that a connecting system such as but not limited to: a pipe, channel, ditch or combination of any natural and/or man-made items to transport water from a high head (HH) to a low head (LH) to generate power. Water enters the power plant from the high head of water (HH) by opening valve (IV1). Connecting pipe system (CP/PS) directs the water to a lower head. The water drops down a penstock to operate a turbine/generator system (TGS) generate more power than the head of water located at valve (IV1) is capable of generating. This is because connecting pipe (CP/PS) transports the water to an elevation that has a lower elevation allowing the penstock to be longer, so more power can be generated then can be at the high head of water (HH). Connecting system (CP/PS) can be designed to carry small, moderate and large volumes of water short, moderate and long distances.

A connecting pipe (CP) is run from upstream to downstream taking advantage of the downward slope to generate an (elevation differential/pressure differential) between the high head (HH) of water upstream and the low head (LH) of water downstream. Thus, if the elevation drops 15 feet over a hundred yards then the system would have approximately a 10- to 15-foot head of water to drop down a penstock to operate a turbine system to generate power. If the decrease in elevation is 50 feet over a downward slope extending four miles, then there would be a potential of having an approximate (40- to 50-foot head of water) to drop down a penstock to generate electricity/perform work. The connecting pipe would need a support structure to keep the original elevation of the head of water to the penstock. The exact height of the connecting pipe's support structure will need to be calculated and tested by an expert in the appropriate arts taking into specific application topography and geological features, which is beyond the purview of this disclosure. Again, if the intake of the connecting pipe in the upstream head of water is 80 feet above sea level and the location of the penstock (which is five miles downstream) is 30 feet above sea level, then there would be about a 35- to 50-foot (elevation/pressure) differential that can be used to generate electricity. The exact elevation/pressure differential between the high head (HH) of water upstream and the low head (LH) of water downstream would need to be calculated by an expert in the appropriate arts depending upon applicable variables for a given installation. Consideration should be given to where the intake valve is positioned to receive upstream water and how much distance is required between the turbine and the low head of water downstream.

Consequently, if the intake valve (IV-1) is 80 feet above sea water (when positioned to receive water from the upstream high head (HH) of water and the low head (LH) of water is 30 feet above sea level then accommodation is necessary for the seasonal rise and fall of the water at the water at the downstream low head (LH) to ensure that power generation can occur as often as desired.

This exemplary embodiment has numerous advantages, such as the fact that dams are not required. Hydroelectric power plants could be placed in numerous locations even at sites where current hydroelectric power technology determined it was not feasible. The support structure for the connecting pipe can be designed to be environmentally friendly. It can also be used for recreational installations (e.g., walking, jogging, picnics, sports fields, fishing, bird watching, etc.).

In operation, the high head (HH) water enters intake valve (IV-1). It travels inside of connecting pipe (CP) to the penstock (PS), which is located downstream. Water drops down (PS) and operates turbine system (TGS) which is implied to be connected to a generator to generate electricity. The (PS) can be vented to atmosphere by air vent (AV/WT). Valve (V) controls whether (AV/WT) is opened or closed. Water passing through turbine system (TGS) empties into the low head (LH) of water. If desired an auxiliary turbine system (AT) can be positioned below the (PS) to capture the water dropping from (PS) and/or capture the force of the water moving downstream.

Figure 33:
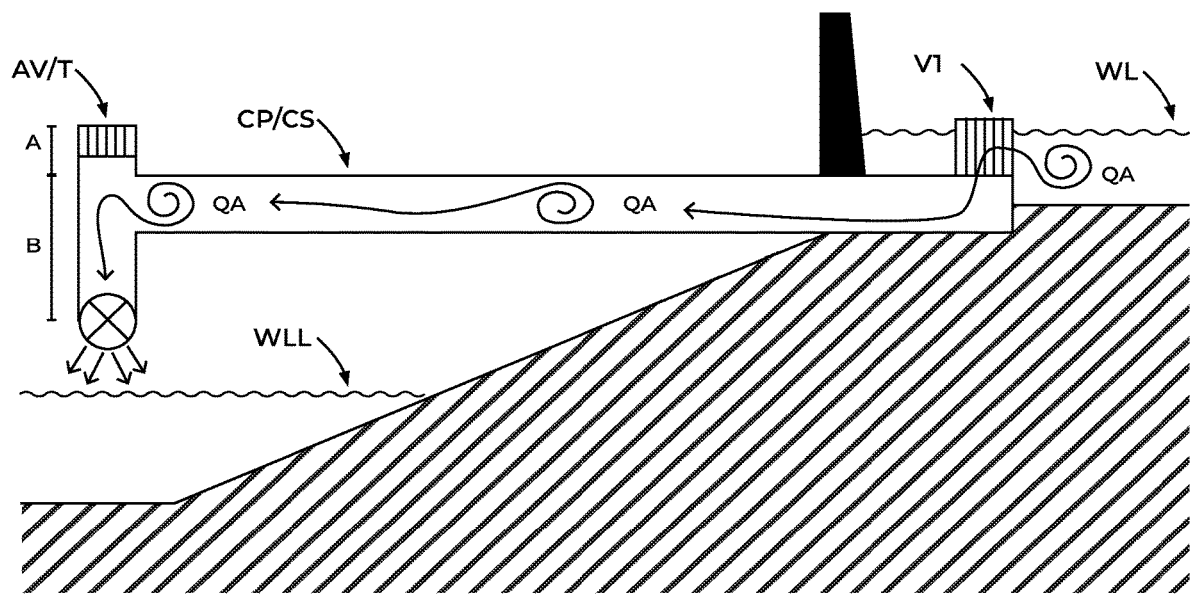
FIG. 33 is an elevation view of a thirtieth exemplary embodiment of the invented power generation system.

FIG. 33 is like FIG. 32 with the following exception. A combination of using a dam and a connecting system mentioned in the written description of FIG. 32 allows water from the high head (WL) to be delivered to a penstock (PS) and turbine generator T/G) system. This system allows the penstock (PS) to be longer than if it were placed into the head of water up stream by valve (V1).

Referring to the exemplary embodiment shown in connection with FIG. 34, this illustrates that the concept can use a delivery system or "elevated structure" (ESCP) in place of a dam and/or to create the effect of a dam to generate a pressure differential between the high head (HH) of water and the low head (LH) of water at the point of discharge (POD) to perform work like but not limited to generating power, operating a mill or mining using the high pressure to strip away the earth.

This innovation allows for work to be done without the construction of a dam. This allows work, like power generation, to be accomplished at many additional sites where the head of water is too low, the elevation at the source is too low, or the construction of a dam would have adverse impact on the land use. Accordingly, the delivery system could send water form near, intermediate or faraway places to perform work, like generating power.

The delivery system or elevated structure (ESCP) allows water to be carried from a high head to a low head to perform work like generating power. The advantage here is that the elevated structure (ESCP) maintains a pressure differential between the high head (HH) and the turbine/generator (T/G) creating a pressure differential to perform work. The delivery system would maintain a high head from its high head source to the penstock (PS). Water would drop down the penstock to activate a turbine/generator system to generate power. The high head of water can be from a natural source or a manmade source. Natural sources can include but not be limited to: rivers, lakes, springs, and runoff water. Manmade sources of water can be but not limited to reservoirs, dams, tanks, over flow systems, flood control systems, catch basin systems and drain systems. Note that a catch basin system can be used to capture, run off, drainage, precipitation and water from a water fall to supply the delivery system's connecting pipe (CP) and or it's penstock (PS).

The types of delivery systems that can be used are too numerous to list but can include and are not limited to: pipe systems, tubing systems, canal systems, aqueducts, troughs, channels, drainage systems, run off systems, spillways, overflow systems and any combinations of these systems. These systems can be made of natural material, manmade/synthetic material and any combination of natural and manmade/synthetic materials. Natural materials that can be used include but not be limited to stone, dirt, clay, wood and/or any combination of those things. Manmade materials that can be used are too numerous to describe but can include but not be limited to: metal, cement/concrete, tile, and synthetic material/s (plastics/rubber/vinyl). Pumps can also be used to lift water up and into the connecting pipe. As long as the pump cost is lower than the power generation this can be a viable alternative. Refer to FIG. 35C, wherein it is demonstrated that a pump system (PPS) can lift water into the delivery system.

Referring specifically to FIG. 34A, this example illustrates the work being performed is generating power or performing work. The delivery system (ESCP) maintains a pressure differential between the high head (HH) and the turbine/generator (T/G) by using a support structure (ESCP) to lift the connecting pipe (CP) above the ground.

The intake valve (IV) controls the flow of water entering connecting pipe (CP). Intake valve IV is opened allowing water from the high head (HH) of water, either natural and/or manmade, to travel through connecting pipe (CP). Water traveling through (CP) eventually drops down penstock (PS) to activate/operate a turbine/generator system (TG). The water then is evacuated from the power plant at the point of discharge, POD. The water exiting the system empties into the low head (LH) of water.

FIGS. 34B and 34C show the delivery system can have open connecting pipes (CP), (similar to eaves troughs/gutter designs), and they can have enclosed connecting pipes. If necessary, the connecting pipe can be part opened and part enclosed. "Q" represents the flow of water (liquid) through both FIG. 34B and FIG. 34C.

Note that, it is entirely possible that some sections of the connecting pipe (CP) may need to travel through the earth like tunnels on a turnpike or an expressway have. FIG. 34A therefore illustrates a portion of connecting pipe (CP) being optionally installed underground.

Note also that, referring to FIGS. 34C and 34B, it is plain to see that the slope/angle of the connecting pipe can vary as desired/necessary. FIG. 34C also demonstrates the (CP) can also serve as the penstock (PS).

Figure 35A:
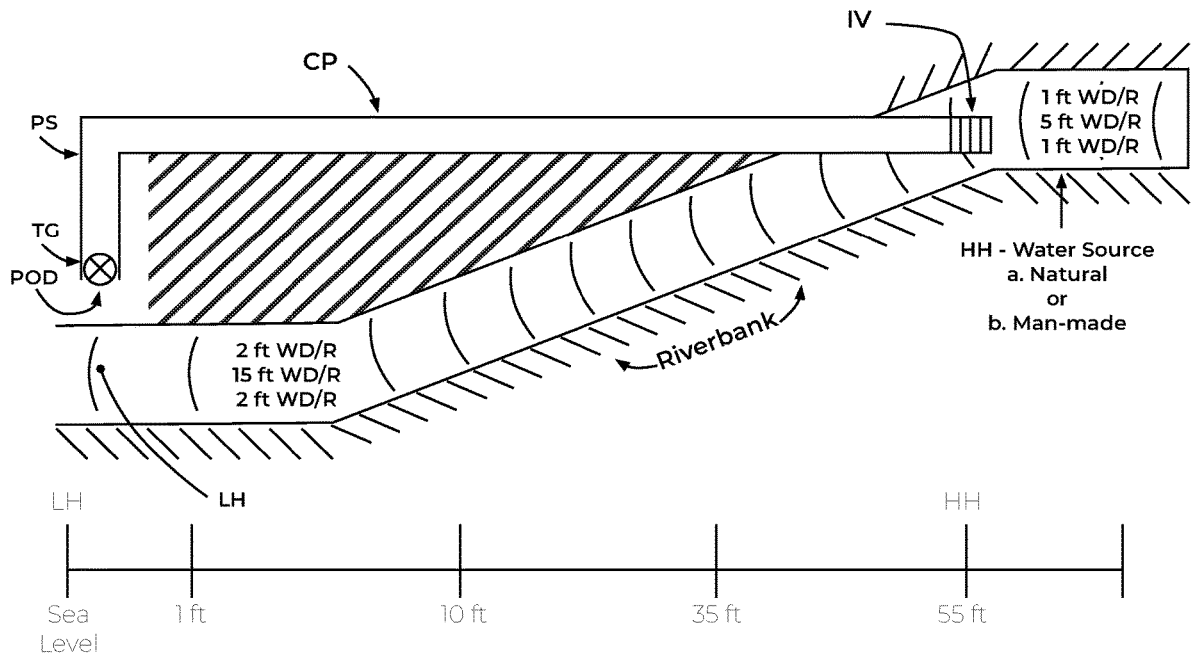
FIG. 35A is an elevation view of a thirty-second exemplary embodiment of the invented power generation system.

Referring to FIG. 35A, this is a variation of the delivery system previously described in connection with FIG. 34. The difference is that this exemplary embodiment maintains the pressure differential between the high head (HH) of water and the low head of water (LH) by elevating the ground along the path. Thus, rather than building a support system that lifts and/or supports the connecting pipe above ground, it raises the ground with natural, manmade or a combination of those things and has the connecting pipe rest on it. Thus, the delivery system or elevated structure (ESCP) uses natural and/or manmade components/material, matter allowing the connecting pipe (CP) to reside while maintaining a pressure differential (height difference) between the high head (HH) of water and the low head (LH) of water.

An elevation scale is provided in FIG. 35A for illustrative purposes. This example shows that the high head (HH) of water is at 55 feet above sea level and the point of discharge (POD) and the turbine generator systems (TG) are somewhere in between. Obviously, the possibilities of pressure differentials (difference in elevation between the high head (HH) and the low head (LH)) are too many to list. FIG. 35A operates in the same manner as the exemplary embodiment shown in connection with FIG. 34A.

Figure 35B:
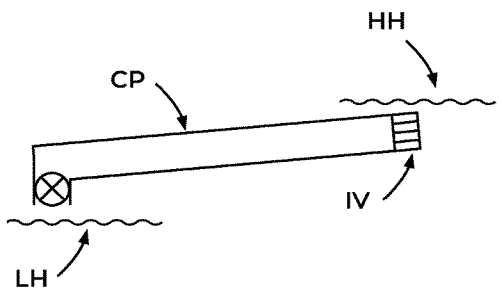
FIG. 35B is an elevation view of an embodiment of a connecting pipe slope for use in connection with exemplary embodiment of the invented power generation system shown in connection with FIG. 35A.
Figure 35C:
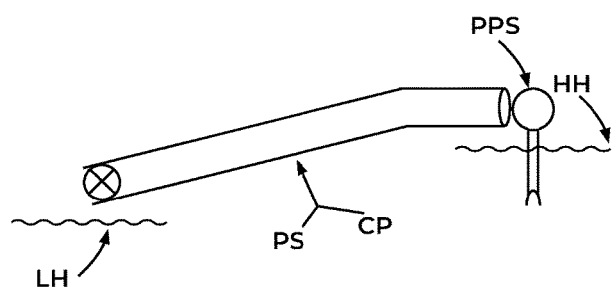
FIG. 35C is an elevation view of a further embodiment of a connecting pipe slope for use in connection with exemplary embodiment of the invented power generation system shown in connection with FIG. 35A.

Referring to FIG. 35B, this variation shows that the connecting pipe (CP) can be at any desired slope/angel as desired or necessary. It does not necessarily need to be horizontal to the ground. Referring to FIG. 35C, this variation illustrates that a pump system can be used to send water to the connecting pipe (CP). There are many practical applications for this that are too numerous to list. They include but are not limited to locations where it is easier to lift water into the (CP) rather than alter the terrain, using a catch basin to collect precipitation, using a catch basin to collect runoff water, water from a water fall, using it as a pump storage system and any of the aforementioned concepts. Also, FIG. 35C shows connecting pipe (CP) can also act as the penstock (PS).

Figure 36A:
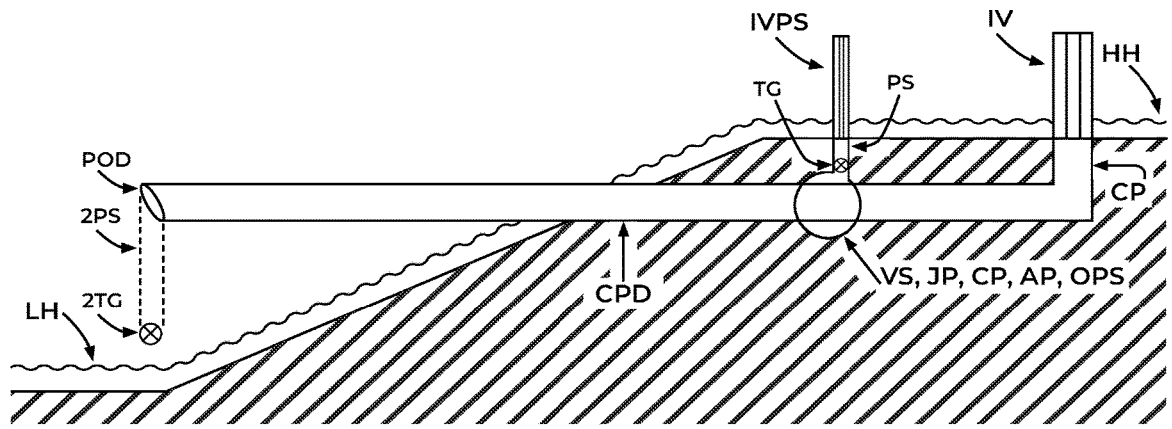
FIG. 36A is an elevation view of a thirty-third exemplary embodiment of the invented power generation system.
Figure 36B:
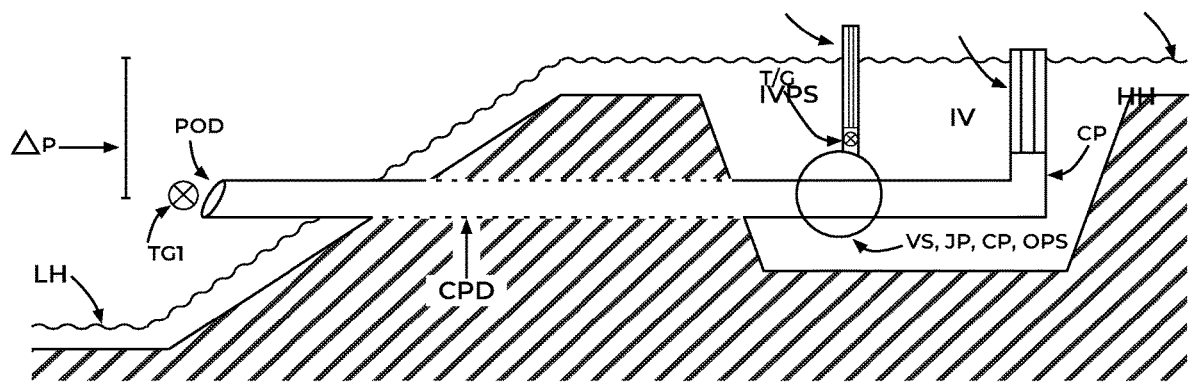
FIG. 36B is an elevation view of the exemplary embodiment of the invented power generation system shown in connection with FIG. 36A with optional excavation features.

The exemplary embodiment shown in connection with FIG. 36 depicts the addition of a turbine/generator system (TG1) outside the point of discharge (POD) in FIG. 36B. Since the water exiting the vacuum pump system has the same high pressure as the water entering it, its energy can be used to perform work, like generating electricity. Although (TG1) can be positioned inside of (CPD) it is positioned outside in this example so that it would not have a detrimental effect on the pressure of the water flowing through the system. Accordingly, placing (TG1) outside of the power plant enables (T/G) to generate power at full capacity and (TG1) captures the pressure differential between the high head of water (HH) and the point of discharge (POD) to maximize the system's power generation. Using both (T/G) and (TG1) will increase the power plants efficacy. Depending upon the pressure differentials it can be a significant power generation increase. Whether (TG1) is positioned inside of (CPD) or outside of it will need to be calculated and tested by an expert in the appropriate arts in a given application of the inventive principles set forth herein. Again, it can be placed at either location if desired.

Figure 36C:
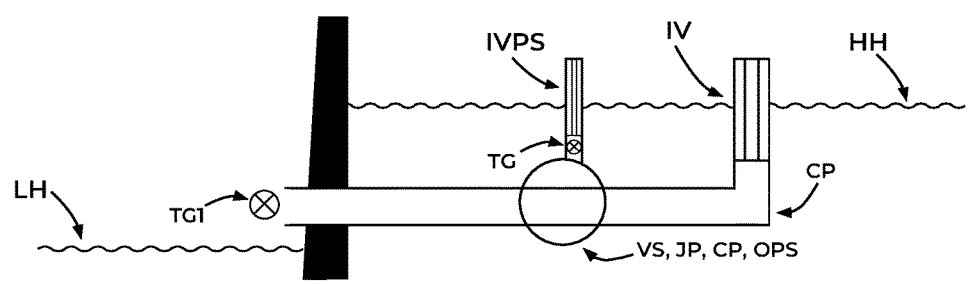
FIG. 36C is an elevation view of a further embodiment of the invented power generation system shown in connection with FIG. 36A as applied to an existing dam structure.

In FIG. 36C, it is illustrated that new construction power plants can increase their power generation by using the same principal of using a venturi or jet pump system to operate a turbine generator system (TG), as well as, using another turbine generator system (TG1) as described in FIG. 36B. Whether (TG1) is positioned inside of (CPD) or outside of it will need to be calculated and tested by an expert in the appropriate arts in a given application of the inventive principles set forth herein. Again, it can be placed at either location if desired.

Additionally, existing power plants can be modified using the same principal described above to increase their power generation. Whether (TG1) is positioned inside of (CPD) or outside of it will need to be calculated and tested by an expert in the appropriate arts in a given application of the inventive principles set forth herein. Again, it can be placed at either location if desired.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A power generation system operating on a working fluid, comprising:
    an inlet receiving a first portion of the working fluid from a high head;
    a power generation component comprising:
        a penstock inlet receiving a second portion of the working fluid from an intermediate head; and
        a turbine generator;
    a vacuum pump system comprising:
        a convergent inlet cone fluidly connected to the inlet;
        a restriction fluidly connected to the convergent inlet cone;
        a low-pressure inlet fluidly connected to the power generation component and the restriction; and
        a divergent outlet cone fluidly connected to the restriction, wherein a combined working fluid is received comprising a combination of the first portion of the working fluid and the second portion of the working fluid; and a connecting pipe fluidly connected to receive the combined working fluid from the vacuum pump system and transmit the combined working fluid to a point of discharge at a low head.

2. The power generation system of claim 1, wherein the intermediate head is less than or equal to the high head.

3. The power generation system of claim 2, wherein the intermediate head is greater than or equal to the low head.

4. The power generation system of claim 1, wherein the intermediate head is equal to the high head and the high head is greater than the low head.

5. The power generation system of claim 1, wherein a ratio of the first portion of the working fluid over the second portion of the working fluid is greater than 1.

6. A power generation system operating on a working fluid, comprising:
   an inlet receiving a first portion of the working fluid from a high head;
   a power generation component comprising a power generator receiving a second portion of the working fluid from an intermediate head;
   a vacuum pump system comprising
      a convergent inlet cone fluidly connected to the inlet;
      a restriction fluidly connected to the convergent inlet cone;
      a low-pressure inlet fluidly connected to the power generation component and the restriction; and
      a divergent outlet cone fluidly connected to the restriction, wherein a combined working fluid is received comprising a combination of the first portion of the working fluid and the second portion of the working fluid; and
   a connecting pipe fluidly connected to receive the combined working fluid from the vacuum pump system and transmit the combined working fluid to a point of discharge at a low head.

7. The power generation system of claim 6, wherein the intermediate head is less than or equal to the high head.

8. The power generation system of claim 7, wherein the intermediate head is greater than or equal to the low head.

9. The power generation system of claim 6, wherein the intermediate head is equal to the high head and the high head is greater than the low head.

10. The power generation system of claim 6, wherein a ratio of the first portion of the working fluid over the second portion of the working fluid is greater than 1.

11. A power generation system operating on a working fluid, comprising:
    an inlet receiving a first portion of the working fluid from a high head;
    a power generation component comprising:
       a penstock inlet receiving a second portion of the working fluid from an intermediate head; and
       a turbine generator;
    a vacuum pump system comprising:
       a diffuser inlet fluidly connected to the inlet;
       a nozzle fluidly connected to the diffuser inlet;
       a low-pressure inlet fluidly connected to the power generation component and the nozzle; and
       a suction chamber fluidly connected to the nozzle and the low-pressure inlet, where a combined working fluid is received comprising a combination of the first portion of the working fluid and the second portion of the working fluid; and
    a connecting pipe fluidly connected to receive the combined working fluid from the vacuum pump system and transmit the combined working fluid to a point of discharge at a low head.

12. The power generation system of claim 11, wherein the intermediate head is less than or equal to the high head.

13. The power generation system of claim 12, wherein the intermediate head is greater than or equal to the low head.

14. The power generation system of claim 11, wherein the intermediate head is equal to the high head and the high head is greater than the low head.

15. The power generation system of claim 11, wherein a ratio of the first portion of the working fluid over the second portion of the working fluid is greater than 1.

16. A power generation system operating on a working fluid, comprising:
    an inlet receiving a first portion of the working fluid from a high head;
    a power generation component comprising a power generator receiving a second portion of the working fluid from an intermediate head;
    a vacuum pump system comprising:
       a diffuser inlet fluidly connected to the inlet;
       a nozzle fluidly connected to the diffuser inlet;
       a low-pressure inlet fluidly connected to the power generation component and the nozzle; and
       a suction chamber fluidly connected to the nozzle and the low-pressure inlet, wherein a combined working fluid is received comprising a combination of the first portion of the working fluid and the second portion of the working fluid; and
    a connecting pipe fluidly connected to receive the combined working fluid from the vacuum pump system and transmit the combined working fluid to a point of discharge at a low head.

17. The power generation system of claim 16, wherein the intermediate head is less than or equal to the high head.

18. The power generation system of claim 17, wherein the intermediate head is greater than or equal to the low head.

19. The power generation system of claim 16, wherein the intermediate head is equal to the high head and the high head is greater than the low head.

20. The power generation system of claim 16, wherein a ratio of the first portion of the working fluid over the second portion of the working fluid is greater than 1.

* * * * *